(12) United States Patent
Smith et al.

(10) Patent No.: US 11,949,201 B2
(45) Date of Patent: Apr. 2, 2024

(54) SURGE PROTECTION MODULE AND RELATED COMPONENTS AND METHODS

(71) Applicant: Viza Electronics Pte. Ltd., Charlotte, NC (US)

(72) Inventors: Simon Christopher Smith, Benfleet (GB); Jack Lula, Burlington (CA); Robert Zamora, Huntersville, NC (US); Anthony Mangiaracina, Mobile, AL (US)

(73) Assignee: Viza Electronics Pte. Ltd., Charlotte, NC (US)

( * ) Notice: Subject to any disclaimer, the term of this patent is extended or adjusted under 35 U.S.C. 154(b) by 0 days.

(21) Appl. No.: 17/701,112

(22) Filed: Mar. 22, 2022

(65) Prior Publication Data

US 2022/0216626 A1 Jul. 7, 2022

Related U.S. Application Data

(63) Continuation of application No. 16/972,188, filed as application No. PCT/US2019/035492 on Jun. 5, 2019, now abandoned.

(Continued)

(51) Int. Cl.
*H01R 9/24* (2006.01)
*H02H 3/04* (2006.01)
(Continued)

(52) U.S. Cl.
CPC ............. *H01R 9/2441* (2013.01); *H02H 3/04* (2013.01); *H02H 9/042* (2013.01); *H02H 9/02* (2013.01)

(58) Field of Classification Search
CPC .. H01R 9/2441; H01R 9/2491; H01R 9/2641; H02H 3/04; H02H 9/04; H02H 9/042;
(Continued)

(56) References Cited

U.S. PATENT DOCUMENTS 2,444,044 A 6/1936 Pond
3,668,609 A 6/1972 Link
(Continued)

FOREIGN PATENT DOCUMENTS

EP 0393854 10/1990
WO WO03085796 10/2003

OTHER PUBLICATIONS

Notification Concerning Transmittal of International Preliminary Report on Patentability issued by the Patent Cooperation Treaty in corresponding International Application No. PCT/US2019/035492 dated Dec. 18, 2020 (15 pages).

(Continued)

*Primary Examiner* — Danny Nguyen
(74) *Attorney, Agent, or Firm* — Lee & Hayes, P.C.

(57) ABSTRACT

A method for assembling a module configured to limit power surge exposure to an electrical device may include providing a carrier configured to receive at least one electrical conductor and at least one surge protection component. A lug defining a hollow space is provided in a pocket of the carrier, and an electrical lead of a surge protection component and an electrical conductor are provided in the hollow space of the lug. The method includes crimping the lug onto the electrical lead of the surge protection component and the electrical conductor such that the electrical lead and the electrical conductor are physically and electrically coupled to one another. The carrier may include multiple pockets receiving multiple lugs, and the multiple lugs may be crimped substantially simultaneously to physically and electrically couple corresponding pairs of electrical leads and conductors.

18 Claims, 20 Drawing Sheets

Related U.S. Application Data

(60) Provisional application No. 62/680,865, filed on Jun. 5, 2018.

(51) Int. Cl.
   *H02H 9/04* (2006.01)
   *H02H 9/02* (2006.01)

(58) Field of Classification Search
   CPC .... H02H 9/06; H01T 4/00; H01T 4/08; H01C 7/12; H01C 8/04
   USPC .................................................. 361/117–120
   See application file for complete search history.

(56) References Cited

U.S. PATENT DOCUMENTS

| | | | |
|---|---|---|---|
| 4,510,476 A | 4/1985 | Clatterbuck et al. | |
| 4,631,433 A | 12/1986 | Stokes | |
| 4,649,457 A | 3/1987 | Talbot et al. | |
| 4,748,531 A | 5/1988 | Ortiz | |
| 5,032,946 A | 7/1991 | Misencik et al. | |
| 5,206,779 A * | 4/1993 | Sato | H01R 13/6666 439/825 |
| 5,224,012 A | 6/1993 | Smith | |
| 5,964,618 A | 10/1999 | McCarthy | |
| 6,556,402 B2 | 4/2003 | Kizis et al. | |
| 7,029,326 B2 | 4/2006 | Montena | |
| 8,435,071 B2 | 5/2013 | Grosskopf et al. | |
| 2004/0178930 A1 | 9/2004 | Cybulski | |
| 2004/0246644 A1 | 12/2004 | Sato et al. | |
| 2012/0092835 A1 * | 4/2012 | Miller | H01R 4/5008 439/864 |
| 2012/0200979 A1 | 8/2012 | Miller et al. | |
| 2015/0109710 A1 * | 4/2015 | Politis | H02H 9/041 361/119 |
| 2015/0229065 A1 | 8/2015 | Buehman et al. | |
| 2016/0126728 A1 | 5/2016 | Kawabata | |
| 2017/0141563 A1 | 5/2017 | Islam et al. | |
| 2017/0207619 A1 | 7/2017 | Islam et al. | |
| 2017/0338649 A1 | 11/2017 | Barcey et al. | |
| 2021/0234289 A1 | 7/2021 | Smith et al. | |

OTHER PUBLICATIONS

Office Actgion for U.S. Appl. No. 16/972,188, dated Sep. 22, 2021, Smith, "Surge Protection Module and Related Components and Methods", 13 Pages.

PCT Invitation to Pay Additional Fees dated Aug. 13, 2019 for PCT Application No. PCT/US19/35492, 2 pages.

The PCT Search Report and Written Opinion dated Nov. 4, 2019 for PCT Application No. PCT/US19/35492, 19 pages.

* cited by examiner

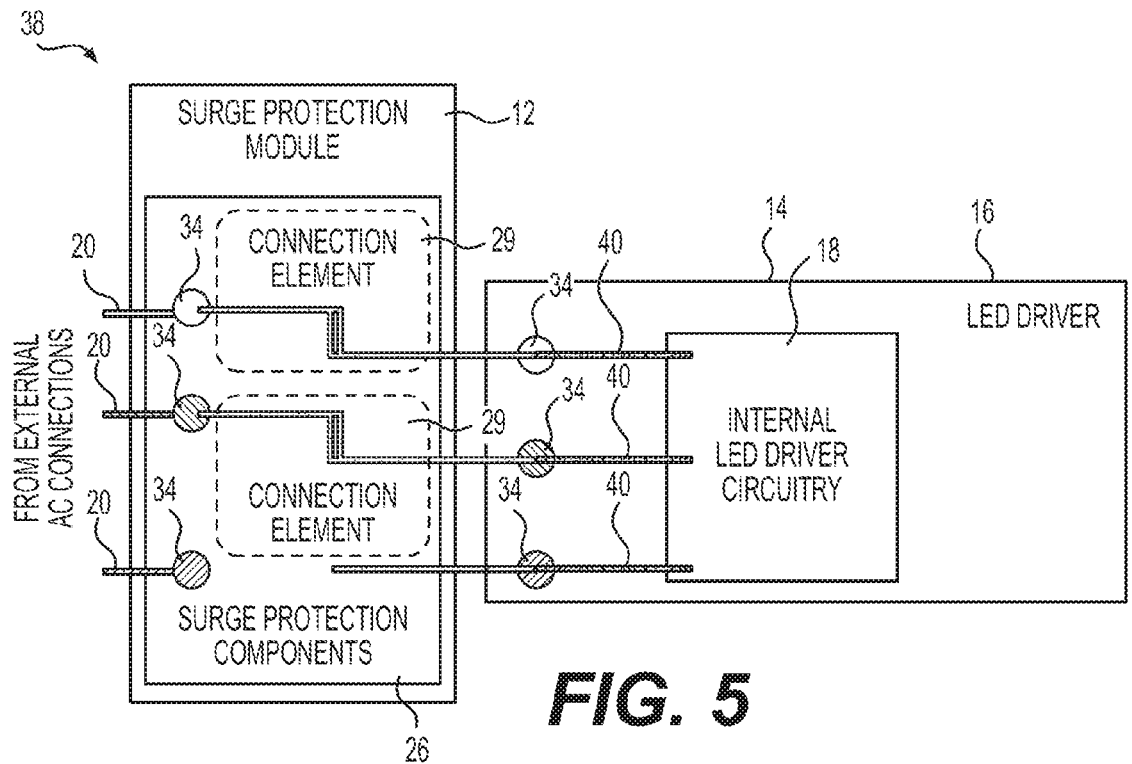
FIG. 5
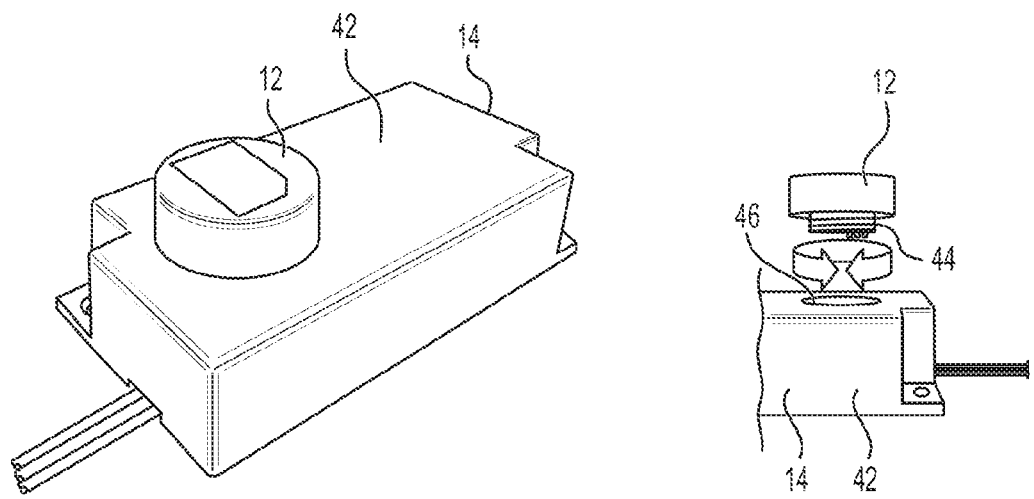
FIG. 6A
FIG. 6B

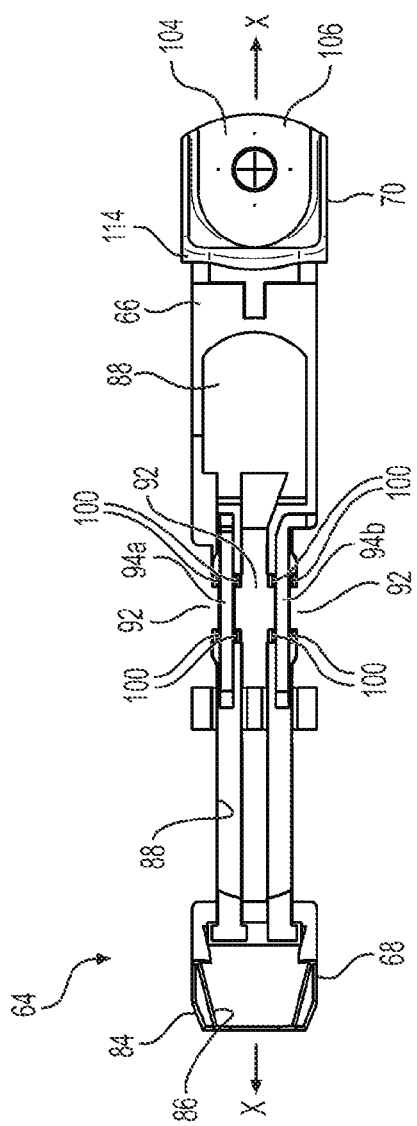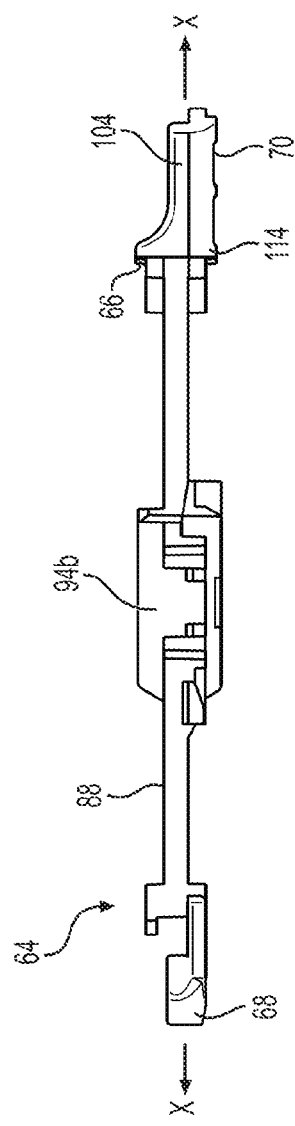

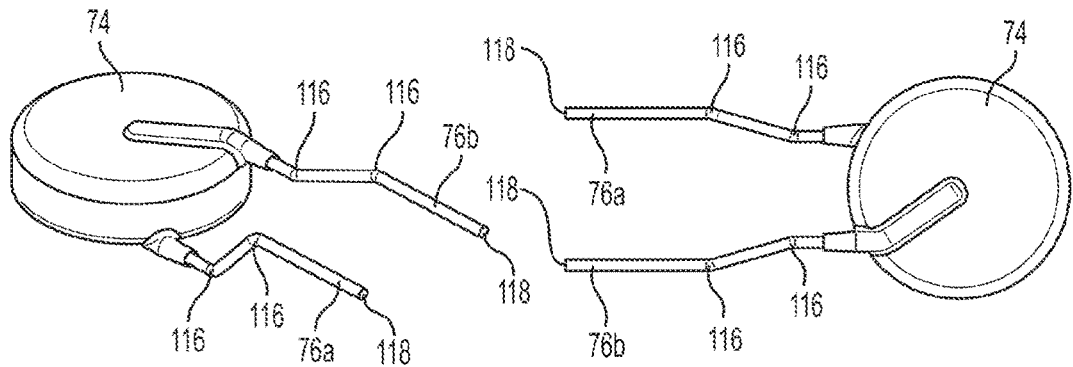
FIG. 19A  FIG. 19B
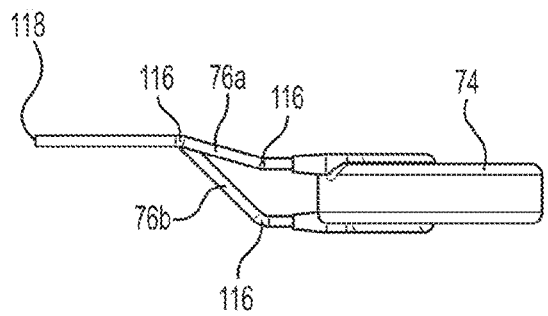
FIG. 19C
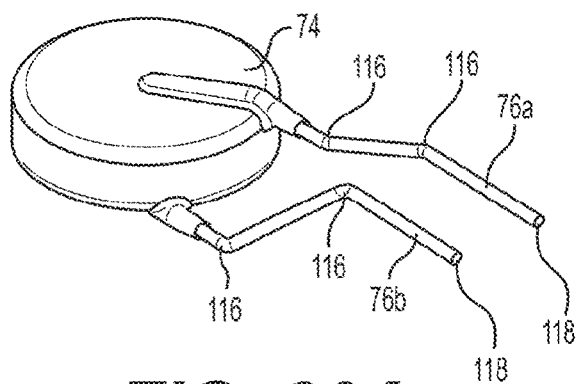
FIG. 20A
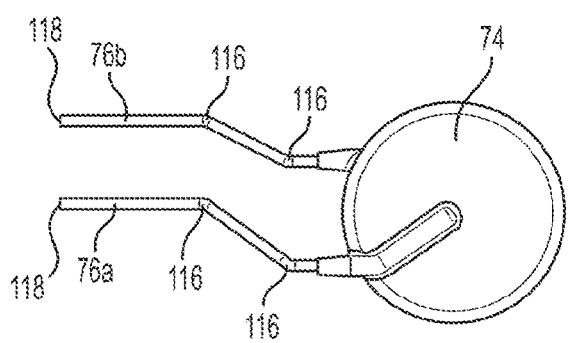
FIG. 20B
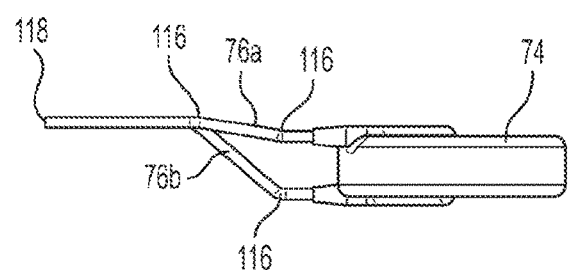
FIG. 20C

SURGE PROTECTION MODULE AND RELATED COMPONENTS AND METHODS

CROSS REFERENCE TO RELATED APPLICATIONS

This is a continuation of U.S. application Ser. No. 16/972,188 filed Dec. 4, 2020, entitled "Surge Protection Module and Related Components and Methods," which is a U.S. national stage application of International Application No. PCT/US19/35492 entitled "Surge Protection Module and Related Components and Methods," filed Jun. 5, 2019, which claims the benefit of priority of U.S. Provisional Application No. 62/680,865, entitled "Surge Protection Module and Related Components and Methods," filed Jun. 5, 2018, all of which are expressly incorporated herein by reference in their entirety.

DESCRIPTION

Background

Many electrical devices are susceptible to damage resulting from power and/or voltage spikes. As a result, surge protectors are often used to protect electrical devices from such surges. Some surge protectors take the form of a separate power strip that may be plugged into an electric outlet and to which an electrical device is connected. In such examples, the power strip is in series between the electric outlet and the electrical device, and may serve as a buffer between spikes associated with the electric outlet and the electrical device.

Such surge protectors may suffer from possible drawbacks. For example, because the surge protector is itself a separate electrical device, its use may be overlooked, resulting in a lack of surge protection for an electrical device. Thus, some surge protectors are integrated into an electrical device to ensure that the surge protector is provided for protection of its associated electrical device. Such integrated surge protectors may also suffer from possible drawbacks. For example, they may create packaging problems due to a desire to reduce the size of some electrical devices. There may be other possible drawbacks. At least some of the examples described herein may mitigate or overcome some such possible drawbacks.

BRIEF DESCRIPTION OF THE DRAWINGS

The detailed description is described with reference to the accompanying figures. The same reference numbers in different figures indicate similar or identical items.

FIG. 5 is a schematic diagram showing an example surge protection module electrically coupled to an example electrical device in another example connection configuration.

FIG. 6A is a perspective view of an example surge protection module coupled to an example electrical device.

FIG. 6B is a perspective view of an example surge protection module coupled to an example electrical device via an example rotational connection.

FIG. 14 is a view from a first side of another example carrier.

FIG. 15 is a view from another side of the example carrier shown in FIG. 14.

FIG. 19A is a perspective view of an example surge protection component including electrical leads having example bends.

FIG. 19B is a top view of the example surge protection component shown in FIG. 19A.

FIG. 19C is a side view of the example surge protection component shown in FIG. 19A.

FIG. 20A is a perspective view of another example surge protection component including electrical leads having example bends.

FIG. 20B is a top view of the example surge protection component shown in FIG. 20A.

FIG. 20C is a side view of the example surge protection component shown in FIG. 20A.

DETAILED DESCRIPTION

Figure 1:
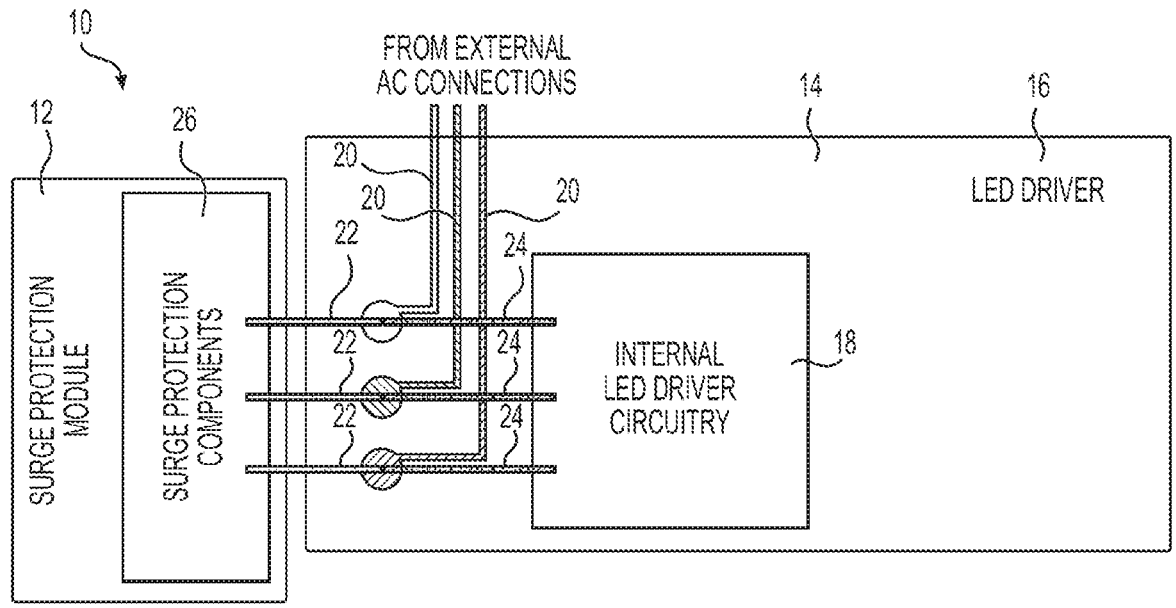
FIG. 1 is a schematic diagram showing an example surge protection module electrically coupled to an example electrical device in a first example connection configuration.

This disclosure is generally directed to a surge protection module and related components and methods. As discussed above, many electrical devices are susceptible to damage resulting from power and/or voltage spikes. As a result, surge protectors are often used to protect electrical devices from such surges. Some surge protectors, however, may suffer from a number of possible drawbacks. For example, if the surge protector is a separate electrical device, its use may be overlooked, resulting in a lack of surge protection for an electrical device. Surge protectors integrated into an electrical device to ensure that the surge protector is provided for protection of its associated electrical device may also suffer from possible drawbacks. For example, they may create packaging problems due to a desire to reduce the size of some electrical devices. There may be other possible drawbacks.

The surge protection modules and related components and methods disclosed herein may mitigate or overcome some possible drawbacks associated with existing surge protectors. For example, some examples of the surge protection modules disclosed herein may allow for selective electrical connection to an electrical device. In some examples, the surge protection modules may be configured for ease of physical and electrical coupling to an electrical device. In some examples, the surge protection modules may be applied on alternating current (AC) main inputs and may be the first point of contact for a surge event. In some examples, the surge protection modules may operate in a standalone manner and/or in association with additional surge protection associated with the electrical device (e.g., surge protection associated with a light emitting diode (LED) driver), for example, depending on whether the surge protection module is electrically coupled in series or parallel with respect to the electrical device. In some examples, the surge protection module may be used in combination with fusing elements, thermal elements, and/or high-power dissipation elements, such as, for example, gas discharge tubes. In some examples, the surge protection module may be integrated into a power electronics circuit or may be used as a stand-alone device (e.g., a device external and independent from an electrical device being protected). In some examples, the surge protection modules may include an indicator of the status of operation of the surge protection module, such as, for example, the remaining service life of the module, failure of the module, and/or operation of the module. In some examples, the surge protection modules may be configured to facilitate an electrical path including line (L), neutral (N), and/or ground (G) connection conductors (e.g., wires) for installation with an electrical device. In some examples, the surge protection modules may be configured (e.g., optimized) for use with LED lighting fixture and/or applications. In some examples, the surge protection modules may be configured (e.g., optimized) for 120 volts (V), 120V-277V, 240V, 347V and/or 347V-480V.

In some examples, the surge protection modules may be configured to provide a compact unit, for example, having elongated and/or thin structure. In some examples, the surge protection modules may be configured to be easily removed and/or replaced. Some examples may include a mounting feature to facilitate mounting to a support. Some examples may not include a mounting feature. As explained herein, some examples of the surge protection modules may be assembled and/or manufactured, for example, without soldering to achieve electrical and/or physical coupling. For example, some electrical and/or physical connections may be formed via a crimping process. As explained herein, some examples of the surge protection modules may include a carrier (e.g., a plastic injection-molded carrier), which may in some examples, facilitate automated and/or consistent manufacturing of the surge protection modules. In some examples including a carrier, the carrier may provide at least partial shielding of electrical conductors. In some examples, the manufacturing may be used to achieve surge protection modules having an inline/wire look appearance.

According to one aspect, a surge protection module may be configured to limit power surge exposure to an electrical device, and the surge protection module may include three terminals configured to be electrically coupled to an electrical device. The three terminals may be configured to provide a series connection and/or a parallel connection to an electrical device to which the three terminals are electrically coupled. The surge protection module may also include at least one surge protection component electrically coupled to the three terminals and configured to limit power surge conducted to an electrical device to which the three terminals are electrically coupled. The surge protection module may also include a mechanical connection configured to mechanically couple the surge protection module to an electrical device to which the surge protection module is electrically coupled. In some examples, the three terminals may be configured to be electrically coupled to at least one of a light emitting diode (LED) driver, an electrical ballast, or a terminal block. In some examples, the three electrical contacts may be configured to be electrically coupled to an electrical device via terminal block pins, spring pins, spring clips, push-in connections, self-piercing pins, and/or any other mechanical wire connection. In some examples, the at least one surge protection component may include one or more of a metal oxide varistor (MOV), a gas discharge tube (GDT), a transient voltage suppression (TVS) diode, a thyristor surge protection device (TSPD), a fuse, an inductor, or a capacitor. In some examples, the mechanical connection may include at least one of a screw, a clip, prongs, a complimentary groove-and-recess connection, a twist-in connection, a plug-in connection, or a push-in connection. In some examples, the mechanical connection may be configured to be coupled directly to at least one of an LED driver, a terminal block, or an electrical ballast. In some examples, the surge protection module may include a status indicator configured to provide an indication of at least one of operability of the surge protection module, remaining service life of the surge protection module, or failure of the surge protection module.

According to another aspect, a surge protection module configured to limit power surge exposure to an electrical device may include a carrier defining a first end and a second end opposite the first end and a longitudinal axis extending between the first end and the second end. The surge protection module may also include at least two electrical conductors coupled to the carrier, and a surge protection component electrically coupled to the at least two electrical conductors and configured to limit power surge conducted to an electrical device to which the at least two electrical conductors are electrically coupled.

In some examples, the surge protection component may include at least two electrical leads, and the surge protection module may further include at least two lugs, wherein each of the at least two lugs receives at least one of the at least two electrical conductors and one of the at least two electrical leads, and electrically couples the at least one electrical conductor and the one electrical lead to one another. In some examples, the at least two lugs are configured to be pressed onto the at least one electrical conductor and the one electrical lead, such that the at least one electrical conductor and the one electrical lead are electrically coupled to one another and physically coupled to one another. In some examples, the at least two lugs may be welded (e.g., electrically-welded and/or thermally-welded) to the at least one electrical conductor and the one electrical lead, such that the at least one electrical conductor and the one electrical lead are electrically coupled to one another and physically coupled to one another. In some examples, the at least two lugs may include a tubular member (e.g., a hollow cylindrical member) receiving an end of the at least one electrical conductor and an end of the one electrical lead.

In some examples, the surge protection module may also include an insulating layer covering at least a portion of the carrier to electrically insulate the electrical connection between the at least two electrical conductors and the surge protection component. In some examples, the insulating layer may include an insulation sleeve covering at least a portion of the carrier to electrically insulate the electrical connection between the at least two electrical conductors and the surge protection component. In some examples, the insulation sleeve may be configured tighten around the at least a portion of the carrier upon exposure to heat (e.g., it may be a heat-shrink sleeve). In some examples, the insulation layer may include a conformal coating, or similar coating, covering at least a portion of the carrier to electrically insulate the electrical connection between the at least two electrical conductors and the surge protection component. For example, the conformal coating may be applied via one or more of brushing, spraying, dipping, or selective coating by machine, and may include conformal coating compositions, such as, for example, one or more of acrylic, epoxy, polyurethane, silicone, fluorinated or non-fluorinated polyparaxylylene (parylene), or amorphous fluoropolymer.

In some examples, the at least two electrical conductors may include three electrical conductors. For example, the surge protection component may be a first surge protection component, and the surge protection module may further include a second surge protection component electrically coupled to at least two electrical conductors of the three electrical conductors, and may be configured to limit power surge conducted to an electrical device to which the at least two electrical conductors are electrically coupled. In some such examples, the first surge protection component may be electrically coupled to a first one of the three electrical conductors and a second one of the three electrical conductors, and the second surge protection component may be electrically coupled to the first one of the three electrical conductors and a third one of the three electrical conductors. In some such examples, each of the first and second surge protection components may include at least two electrical leads, and the surge protection module may further include at least three lugs. In some examples, a first one of the at least three lugs may receive: the first one of the three electrical conductors, a first one of the at least two electrical leads of the first surge protection component, and a first one of the at least two electrical leads of the second surge protection component. In some such examples, a second one of the three lugs may receive a second one of the three electrical conductors and a second one of the at least two electrical leads of the first surge protection component. In some examples, a third one of the three lugs may receive a third one of the three electrical conductors and a second one of the at least two electrical leads of the second surge protection component.

In some examples, the surge protection module may include a third surge protection component electrically coupled to the at least two electrical conductors. In some such examples, the surge protection module may also include a fourth surge protection component electrically coupled to the at least two electrical conductors.

In some examples, the carrier may define at least one conductor channel extending from the first end of the carrier toward the second end of the carrier and receiving at least one of the at least two electrical conductors. In some examples, the at least one conductor channel may include three conductor channels, and each of the conductor channels may be configured to receive an electrical conductor. In some examples, the at least one conductor channel may include a grip engaged with the at least one electrical conductor. Some examples may include a grip in each of two or three conductor channels.

In some examples, the first end of the carrier may define an outer surface that tapers in a direction away from the second end of the carrier. In some examples, the first end of the carrier may define an inner surface that tapers in a direction away from the second end of the carrier.

In some examples, the carrier may define a recess receiving at least a portion of a surge protection component. In some examples, the carrier may define at least one conductor channel extending from the first end of the carrier toward the second end of the carrier and receiving at least one of the at least two electrical conductors, and the recess may be located between the at least one conductor channel and the second end of the carrier. In some examples, the carrier may define at least one lead channel extending between the recess and the at least one conductor channel and receiving a lead of the surge protection component.

In some examples, the carrier may define at least one pocket receiving a lug electrically coupling and physically coupling a first electrical conductor to a lead of the surge protection component. In some examples, the at least one pocket may include a first pocket receiving a first lug and a second pocket adjacent the first pocket and receiving a second lug. The carrier may further include a pocket barrier between the first pocket and the second pocket and separating the first lug and the second lug from one another. In some examples, the at least one pocket may pass through the carrier (e.g., from a first side of the carrier to a second side of the carrier). In some examples, the at least one pocket may define at least one tab configured to prevent the lug from passing through the carrier.

In some examples, the second end of the carrier may define a mounting boss configured to facilitate mounting of the surge protection module to a support. In some examples, the carrier may define a notch between the mounting boss and a remainder of the carrier, and the notch may be configured to facilitate separation of the mounting boss from the remainder of the carrier. In some examples, the mounting boss may define a flange defining a mounting hole configured to receive a fastener for mounting the surge protection module to the support. In some examples, the flange may define a plane extending either substantially parallel with respect to the longitudinal axis of the carrier, obliquely with respect to longitudinal axis of the carrier, or substantially perpendicular with respect to the longitudinal axis of the carrier. In some examples, the flange may include a first flange, and the mounting boss may further include a second flange defining a mounting hole configured to receive a fastener for mounting the surge protection module to the support. In some such examples, each of the first flange and the second flange may define a flange plane, and the flange plane of first flange and the flange plane of the second flange may be at an angle with respect to one another, for example, a non-zero angle, an angle of about 30 degrees, an angle of about 45 degrees, an angle of about 60 degrees, an angle of about 90 degrees, an angle of about 120 degrees, an angle of about 135 degrees, or an angle of about 150 degrees. In some examples, the mounting boss may include at least one reinforcement rib (e.g., two, three, or four reinforcement ribs) configured to strengthen the mounting boss.

In some examples, the carrier may define a flange at the second end of the carrier and configured to provide a stop for the insulation sleeve, for example, to prevent the insulation sleeve from extending over the mounting boss. For example, in examples having an insulation sleeve, the insulation sleeve may be pushed from the first end of the carrier, over the carrier until the leading end of the insulation sleeve abuts the flange.

According to yet another aspect, a carrier configured to receive components of a surge protection module may define an elongated carrier body. The elongated carrier body may define a first end and a second end opposite the first end and a longitudinal axis extending between the first end and the second end. The carrier body may further define at least one conductor channel extending from the first end toward the second end and configured to receive at least one electrical conductor. The carrier body may also define a recess configured to receive at least a portion of a surge protection component, and at least one pocket configured to receive a lug for electrically coupling and for physically coupling a first electrical conductor to a lead of a surge protection component. In some examples, the carrier body may define two or three conductor channels, each configured to receive an electrical conductor. In some examples, the at least one conductor channel may include a grip configured to engage at least one electrical conductor.

In some examples of the carrier, the first end of the carrier body may define an outer surface that tapers in a direction away from the second end of the carrier body. In some examples, the first end of the carrier body may define an inner surface that tapers in a direction away from the second end of the carrier body. This may bring the electrical conductors closer to one another, which may reduce inductance generated in the electrical conductors. In some examples, two or more of the electrical conductors may be included in a zip-cord wire (e.g., a pre-bonded zip-cord wire).

In some examples of the carrier, the carrier body may define at least one conductor channel extending from the first end of the carrier body toward the second end of the carrier and configured to receive at least one electrical conductor. In some such examples, the recess may be located between the at least one conductor channel and the second end of the carrier body. In some examples, the carrier body may define at least one lead channel extending between the recess and the at least one conductor channel and configured to receive a lead of a surge protection component.

In some examples, the at least one pocket may include a first pocket configured to receive a first lug and a second pocket adjacent the first pocket and configured to receive a second lug. In some such examples, the carrier body may also include a pocket barrier between the first pocket and the second pocket and configured to separate a first lug and a second lug from one another. Such examples may provide electrical insulation between the lugs, which may provide compliance with some electrical regulations.

In some examples, the at least one pocket may pass through the carrier body, for example, from a first side of the carrier body to an opposite second side of the carrier body. This may facilitate pressing the lugs using a press having opposing dies that approach one another during the pressing process and contact the lugs from opposite sides to facilitate crimping the lugs. In some examples, the at least one pocket may define at least one tab configured to prevent a lug from passing through the carrier body. In some such examples, the lug may be provided in the pocket but be prevented from passing through the pocket and separating from the carrier body.

In some examples of the carrier, the second end of the carrier body may define a mounting boss configured to facilitate mounting of the carrier to a support. In some such examples, the carrier body may define a notch between the mounting boss and a remainder of the carrier body, and the notch may be configured to facilitate separation of the mounting boss from the remainder of the carrier body, for example, with or without using a cutting device. In some examples, the mounting boss may be frangible and thus separable from the remainder of the carrier body.

In some examples of the carrier, the mounting boss may define a flange defining a mounting hole configured to receive a fastener for mounting the carrier to a support. In some examples, the flange may define a plane extending either substantially parallel with respect to the longitudinal axis of the carrier body, obliquely with respect to longitudinal axis of the carrier body, or substantially perpendicular with respect to the longitudinal axis of the carrier body. In some examples, the flange may include a first flange, and the mounting boss may further include a second flange defining a mounting hole configured to receive a fastener for mounting the carrier to a support. Each of the first flange and the second flange may define a flange plane, and the flange plane of first flange and the flange plane of the second flange may be at an angle with respect to one another, for example, as described herein. In some examples, the mounting boss may include at least one reinforcement rib configured to strengthen the mounting boss, for example, as described herein.

In some examples, the carrier body may include a flange at the second end of the carrier body and configured to provide a stop for an insulation sleeve, for example, as described herein.

In some examples of the carrier, the carrier body may define a first side and a second side opposite the first side, and the at least one recess may include a first recess in the first side of the carrier body and a second recess in the second side of the carrier body. In some examples, the carrier body may define an opening configured to permit at least one electrical lead of a surge protection component to pass from the first side of the carrier body to the second side of the carrier body. In some examples, the at least one recess may further include a third recess in the first side of the carrier body and a fourth recess in the second side of the carrier body. Each of the first recess, the second recess, the third recess, and the fourth recess may be configured to receive at least a portion a surge protection component.

In some examples, the carrier body may define at least one opening configured to: facilitate electrical leads of a surge protection component at least partially received in the second recess to pass from the second side of the carrier body to the first side of the carrier body; and facilitate electrical leads of a surge protection component at least partially received in the fourth recess to pass from the second side of the carrier body to the first side of the carrier body.

According to still a further aspect, a method (e.g., for assembling a surge protection module) may include providing a carrier configured to receive at least one electrical conductor and at least one surge protection component, with the carrier defining a pocket. The method may further include providing a lug in the pocket of the carrier, with the lug defining a hollow space. The method may also include providing an electrical lead of a surge protection component in the hollow space of the lug, and providing an electrical conductor in the hollow space of the lug. The method may also include one or more of pressing the lug to crimp the lug onto the electrical lead of the surge protection component and the electrical conductor or welding the lug onto the electrical lead of the surge protection component and the electrical conductor (with or without the lone or more of the lugs), such that the electrical lead and the electrical conductor are physically coupled to one another and electrically coupled to one another.

In some examples of the method, the carrier may define a first pocket and a second pocket, with each of the first pocket and the second pocket being configured for receiving a lug defining a hollow space. In such examples, providing the lug in the pocket of the carrier may include providing a first lug in the first pocket, with the first lug defining a first hollow space, and providing a second lug in the second pocket, with the second lug defining a second hollow space. In some such examples, providing the electrical lead of the surge protection component in the hollow space of the lug may include providing a first electrical lead of the surge protection component in the first hollow space of the first lug, and providing a second electrical lead of the surge protection component in the second hollow space of the second lug.

In some examples, providing an electrical conductor in the hollow space of the lug may include providing a first electrical conductor in the first hollow space of the first lug, and providing a second electrical conductor in the second hollow space of the second lug. In some examples, pressing the lug to crimp the lug may include: (1) pressing the first lug to crimp the first lug onto the first electrical lead of the surge protection component and the first electrical conductor, such that the first electrical lead and the first electrical conductor are physically coupled to one another and electrically coupled to one another; and (2) pressing the second lug to crimp the second lug onto the second electrical lead of the surge protection component and the second electrical conductor, such that the second electrical lead and the second electrical conductor are physically coupled to one another and electrically coupled to one another.

In some examples, the carrier may further define a third pocket configured for receiving a lug defining a hollow space. In such examples, providing the lug in the pocket of the carrier may include providing a third lug in the third pocket, with the third lug defining a third hollow space, and providing an electrical conductor in the hollow space of the lug may include providing a third electrical conductor in the third hollow space of the third lug. In some such examples, pressing the lug to crimp the lug may include: (1) pressing the first lug to crimp the first lug onto the first electrical lead of the surge protection component and the first electrical conductor, such that the first electrical lead and the first electrical conductor are physically coupled to one another and electrically coupled to one another; (2) pressing the second lug to crimp the second lug onto the second electrical lead of the surge protection component and the second electrical conductor, such that the second electrical lead and the second electrical conductor are physically coupled to one another and electrically coupled to one another; and (3) pressing the third lug to crimp the third lug onto the third electrical conductor, such that the third lug and the third electrical conductor are physically coupled to one another and electrically coupled to one another.

In some examples, the method may further include providing an insulation layer over at least a portion of the carrier. For example, the method may include sliding an insulation sleeve over at least a portion of the carrier. In some examples, the carrier may include a flange at an end of the carrier, and sliding the insulation sleeve over at least a portion of the carrier may include sliding the insulation sleeve over the carrier, such that an end of the insulation sleeve abuts the flange of the carrier. In some examples, the method may further include heating the insulation sleeve such that the insulation sleeve shrinks tightly around the carrier. In some examples, the method may include providing an insulating layer including a conformal coating, or similar coating, covering at least a portion of the carrier to electrically insulate the electrical connection between the at least two electrical conductors and the surge protection component. For example, the conformal coating may be applied via one or more of brushing, spraying, dipping, or selective coating by machine, and may include conformal coating compositions, such as, for example, one or more of acrylic, epoxy, polyurethane, silicone, fluorinated or non-fluorinated polyparaxylylene (parylene), or amorphous fluoropolymer.

In some examples of the method, the surge protection component may include a first surge protection component, and the method may further include: providing a first electrical lead of a second surge protection component in the first lug, and providing a second electrical lead of the second surge protection component in one of the second hollow space of the second lug or the third hollow space of the third lug. In some such examples, pressing the lug to crimp the lug may include: (1) pressing the first lug to crimp the first lug onto the first electrical lead of the first surge protection component, the first electrical lead of the second surge protection component, and the first electrical conductor, such that the first electrical lead of the first surge protection component, the first electrical lead of the second surge protection component, and the first electrical conductor are physically coupled to one another and electrically coupled to one another; (2) pressing the second lug to crimp the second lug onto the second electrical lead of the first surge protection component and the second electrical conductor, such that the second electrical lead and the second electrical conductor are physically coupled to one another and electrically coupled to one another; and (3) pressing the third lug to crimp the third lug onto the second electrical lead of the second surge protection component and the third electrical conductor, such that the second electrical lead of the second surge protection component and the third electrical conductor are physically coupled to one another and electrically coupled to one another.

In some examples of the method, it may further include providing a first electrical lead of a third surge protection component in the first lug, and providing a second electrical lead of the third surge protection component in one of the second hollow space of the second lug or the third hollow space of the third lug. In some such examples, pressing the lug to crimp the lug may include: (1) pressing the first lug to crimp the first lug onto the first electrical lead of the first surge protection component, the first electrical lead of the second surge protection component, the first electrical lead of the third surge protection component, and the first electrical conductor, such that the first electrical lead of the first surge protection component, the first electrical lead of the second surge protection component, the first electrical lead of the third surge protection component, and the first electrical conductor are physically coupled to one another and electrically coupled to one another; (2) pressing the second lug to crimp the second lug onto and the second electrical lead of the first surge protection component, the second electrical lead of the third surge protection component, and the second electrical conductor, such that the second electrical lead of the first surge protection component, the second electrical lead of the third surge protection component, and the second electrical conductor are physically coupled to one another and electrically coupled to one another; and (3) pressing the third lug to crimp the third lug onto the second electrical lead of the second surge protection component and the third electrical conductor, such that the second electrical lead of the second surge protection component and the third electrical conductor are physically coupled to one another and electrically coupled to one another.

In some examples, the method may further include providing a first electrical lead of a fourth surge protection component in the first lug, and providing a second electrical lead of the fourth surge protection component in one of the second hollow space of the second lug or the third hollow space of the third lug. In some such examples, pressing the lug to crimp the lug may include: (1) pressing the first lug to crimp the first lug onto the first electrical lead of the first surge protection component, the first electrical lead of the second surge protection component, the first electrical lead of the third surge protection component, the first electrical lead of the fourth surge protection component, and the first electrical conductor, such that the first electrical lead of the first surge protection component, the first electrical lead of the second surge protection component, the first electrical lead of the third surge protection component, the first electrical lead of the fourth surge protection component, and the first electrical conductor are physically coupled to one another and electrically coupled to one another; (2) pressing the second lug to crimp the second lug onto and the second electrical lead of the first surge protection component, the second electrical lead of the third surge protection component, and the second electrical conductor, such that the second electrical lead of the first surge protection component, the second electrical lead of the third surge protection component, and the second electrical conductor are physically coupled to one another and electrically coupled to one another; and (3) pressing the third lug to crimp the third lug onto the second electrical lead of the second surge protection component, the second electrical lead of the fourth surge protection component, and the third electrical conductor, such that the second electrical lead of the second surge protection component, the second electrical lead of the fourth surge protection component, and the third electrical conductor are physically coupled to one another and electrically coupled to one another.

In some examples of the method, pressing the first lug and pressing the second lug may include pressing the first lug and the second lug substantially simultaneously (e.g., concurrently). In some examples, pressing the first lug, pressing the second lug, and pressing the third lug may include pressing the first lug, the second lug, and the third lug substantially simultaneously (e.g., concurrently).

In some examples of the method, the carrier may define a first side and a second side opposite the first side, and the method may include providing the first surge protection component on the first side of the carrier, and providing the second surge protection component on the second side of the carrier. In some such examples, the first side of the carrier may define a first recess, the second side of the carrier may define a second recess, and the method may include providing at least a portion of the first surge protection component in the first recess of the carrier, and providing at least a portion of the second surge protection component in the second recess of the carrier.

In some examples of the method, the carrier may define a first side and a second side opposite the first side, and the method may include providing the first surge protection component on the first side of the carrier, providing the second surge protection component on the second side of the carrier, and providing the third surge protection component on either the first side of the carrier or the second side of the carrier. In some such examples, the first side of the carrier may define a first recess and a second recess, and the second side of the carrier defines a third recess. In such examples, the method may include providing at least a portion of the first surge protection component in the first recess of the carrier, providing at least a portion of the second surge protection component in the second recess of the carrier, and providing at least a portion of the third surge protection component in the third recess of the carrier.

In some examples of the method, the carrier may define a first side and a second side opposite the first side, and wherein the method may include providing the first surge protection component on the first side of the carrier, providing the second surge protection component on the first side of the carrier, providing the third surge protection component on the second side of the carrier, and providing the fourth surge protection component on the second side of the carrier. In some such examples, the first side of the carrier may define a first recess and a second recess, and the second side of the carrier may define a third recess and a fourth recess. In such examples, the method may include providing at least a portion of the first surge protection component in the first recess of the carrier, providing at least a portion of the second surge protection component in the second recess of the carrier, providing at least a portion of the third surge protection component in the third recess of the carrier, and providing at least a portion of the fourth surge protection component in the fourth recess of the carrier. In some such examples, the method may further include securing the first surge protection component, the second surge protection component, the third surge protection component, and the fourth surge protection component to the carrier prior to pressing the first lug, second lug, and third lug.

According to yet a further aspect, a method may include providing at least one electrical conductor in a first lug having a first hollow space, providing at least one electrical conductor in a second lug having a second hollow space, and providing at least one electrical conductor in a third lug having a third hollow space. The method may further include pressing the first lug, the second lug, and the third lug to physically couple and electrically couple the first lug, the second lug, and the third lug to the respective electrical conductors. In some examples, the pressing may include forming at least one of the first lug, the second lug, or the third lug, such that the first lug, the second lug, or the third lug has a substantially rectangular cross-sectional shape (e.g., a substantially square or substantially diamond cross-sectional shape).

In some examples, pressing the first lug, the second lug, and the third lug may include pressing the first lug, the second lug, and the third lug substantially simultaneously (e.g., concurrently). In some examples, pressing the first lug, the second lug, and the third lug may include pressing the first lug, the second lug, and the third lug at substantially equal force and/or pressure.

According to still a further aspect, a method may include providing a surge protection component including a first electrical lead and a second electrical lead, and forming the first electrical lead and/or the second electrical lead, such that the at least one electrical lead includes at least one bend (e.g., two or more bends). In some examples of the method, forming the first electrical lead and/or the second electrical lead may include placing the least one electrical lead into a forming die configured to bend the at least one electrical lead. In some such examples, the method may further include pressing the at least one electrical lead such that it is formed to include at least one bend (e.g., two or more bends).

In some examples, the pressing may include activating a press device (e.g., a press device as described herein) or operating a hand-operated pressing tool.

FIG. 1 is a schematic diagram showing a first example connection configuration 10 including an example surge protection module 12 electrically coupled to an example electrical device 14. In the example shown in FIG. 1, the electrical device 14 includes a light emitting diode (LED) driver 16 including internal LED driver circuitry 18. Other types of electrical devices are contemplated. The example connection configuration 10 shown in FIG. 1 is a parallel connection in which three alternating current (AC) input lines 20 from external alternating current connections are electrically coupled to three electrical conductors 22 of the example surge protection module 12 and three electrical conductors 24 coupled to the LED driver 16 to electrically couple the LED driver circuitry 18 to provide a parallel connection. The three electrical conductors 22 are electrically coupled to surge protection components 26 of the surge protection module 12 to provide surge protection for the LED driver 16. The surge protection components 26 may include, for example, one or more metal oxide varistors (MOVs), gas discharge tubes (GDTs), transient voltage suppression (TVS) diodes, thyristor surge protection devices (TSPDs), fuses, inductors, and/or capacitors. In the example shown in FIG. 1, the surge protection module 12 is coupled directly the LED driver 16. Other coupling strategies are contemplated. The AC input lines 20 may be connected according to the following connection configurations: line/neutral, line/neutral/ground, line 1/line 2, or line 1/line 2/ground. Although shown with external AC input lines 20, the example shown may be coupled to direct current (DC) input lines, which may be connected according to the following connection configurations: DC+/DC− or DC+/DC−/ground.

Figure 2:
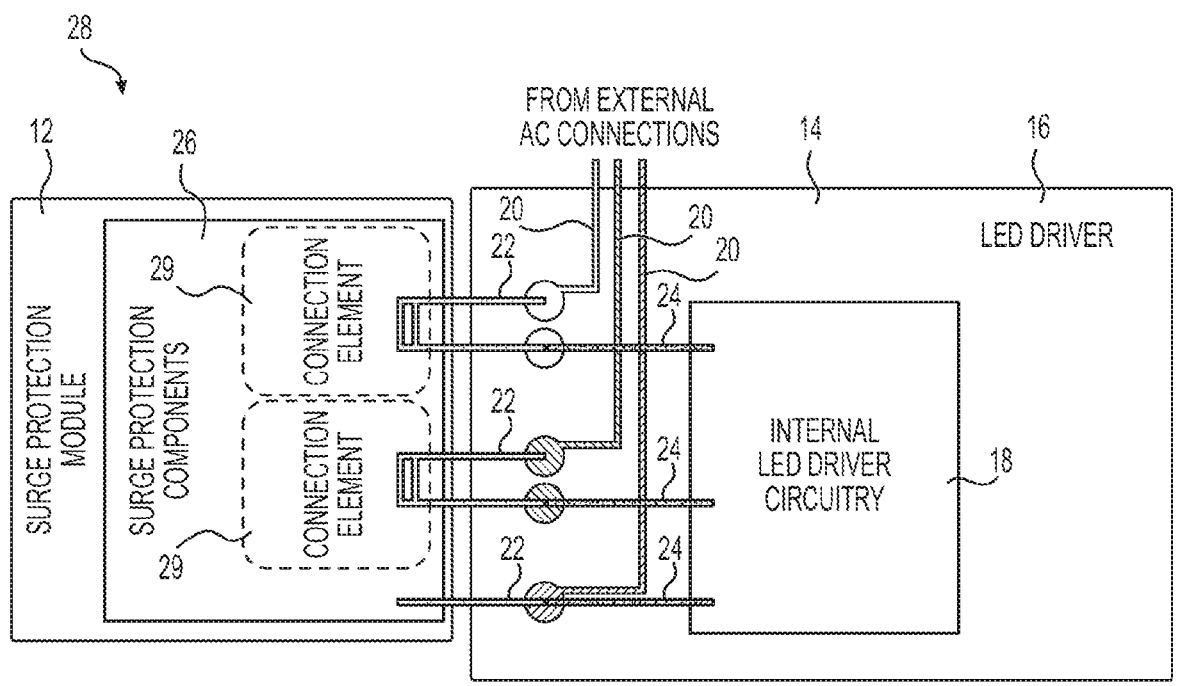
FIG. 2 is a schematic diagram showing an example surge protection module electrically coupled to an example electrical device in another example connection configuration.

FIG. 2 is a schematic diagram showing another example connection configuration 28 including an example surge protection module 12 electrically coupled to an example electrical device 14. In the example shown in FIG. 2, the electrical device 14 includes an LED driver 16 including internal LED driver circuitry 18. Other types of electrical devices are contemplated. The example connection configuration 28 shown in FIG. 2 is a series connection in which three AC input lines 20 from external alternating current connections are electrically coupled to three electrical conductors 22 of the example surge protection module 12. Two of the three electrical conductors 22 are electrically coupled to two surge protection components 26 and two connection elements 29, and the output of each of the two surge protection components 26 is electrically coupled to an electrical conductor 24 coupled to the LED driver circuitry of the LED driver 16. The connection elements 29 may include, for example, wires, fuses, and/or inductors. A third one of the AC input lines 20 is electrically coupled to a third one of the electrical conductors 22 of the surge protection module 12 and to a third electrical conductor 24 coupled to the LED driver circuitry of the LED driver 16. The surge protection components 26 may include, for example, one or more metal oxide varistors (MOVs), gas discharge tubes (GDTs), transient voltage suppression (TVS) diodes, thyristor surge protection devices (TSPDs), fuses, inductors, and/or capacitors. In the example shown in FIG. 2, the surge protection module 12 is coupled directly the LED driver 16. Other coupling strategies are contemplated. The AC input lines 20 may be connected according to the following connection configurations: line/neutral, line/neutral/ground, line 1/line 2, or line 1/line 2/ground. Although shown with external AC input lines 20, the example shown may be coupled to direct current (DC) input lines, which may be connected according to the following connection configurations: DC+/DC− or DC+/DC−/ground.

Figure 3:
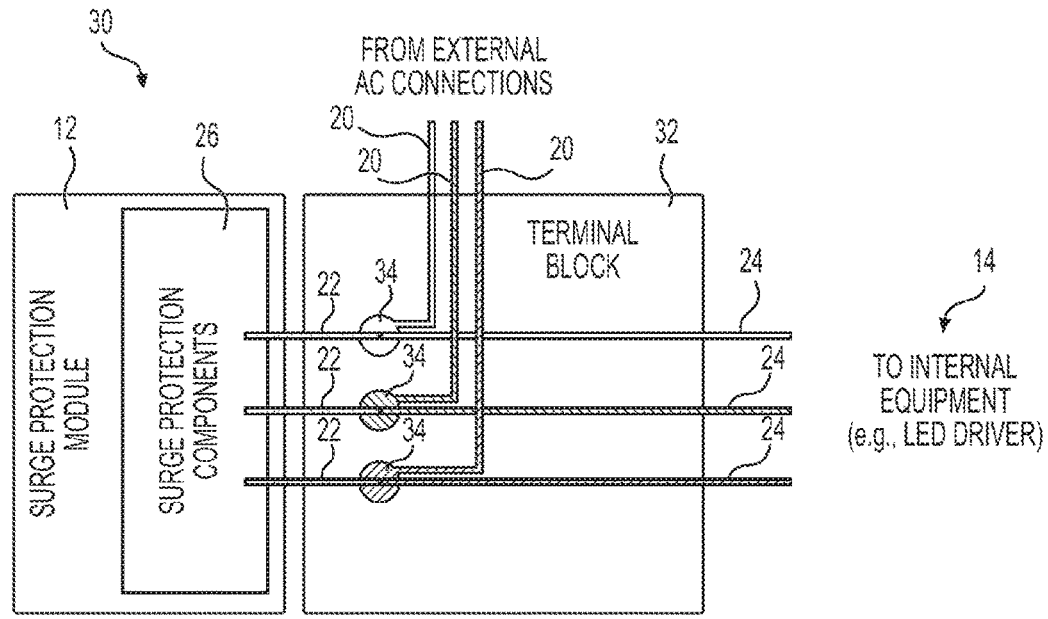
FIG. 3 is a schematic diagram showing an example surge protection module electrically coupled to an example terminal block in an example connection configuration.

FIG. 3 is a schematic diagram showing another example connection configuration 30 including an example surge protection module 12 electrically coupled to an example electrical device 14 via an example terminal block 32. In the example shown in FIG. 3, the electrical device 14 is an LED driver 16. Other types of electrical devices are contemplated. The example connection configuration 30 shown in FIG. 3 is a parallel connection in which three alternating current (AC) input lines 20 from external alternating current connections are electrically coupled to three electrical conductors 22 of the example surge protection module 12 and three terminal connections 34, which, in turn, are electrically coupled to three electrical conductors 24 coupled to the LED driver 16 to electrically couple the LED driver 16 to provide a parallel connection. The three electrical conductors 22 are electrically coupled to surge protection components 26 of the surge protection module 12 to provide surge protection for the LED driver 16. The surge protection components 26 may include, for example, one or more metal oxide varistors (MOVs), gas discharge tubes (GDTs), transient voltage suppression (TVS) diodes, thyristor surge protection devices (TSPDs), fuses, inductors, and/or capacitors. In the example shown in FIG. 3, the surge protection module 12 is coupled directly the terminal block 32. Other coupling strategies are contemplated. The terminal connections 34 may include one or more screw terminals, poke-in connections, insulation displacement, and/or any other form of electrical connections.

Figure 4:
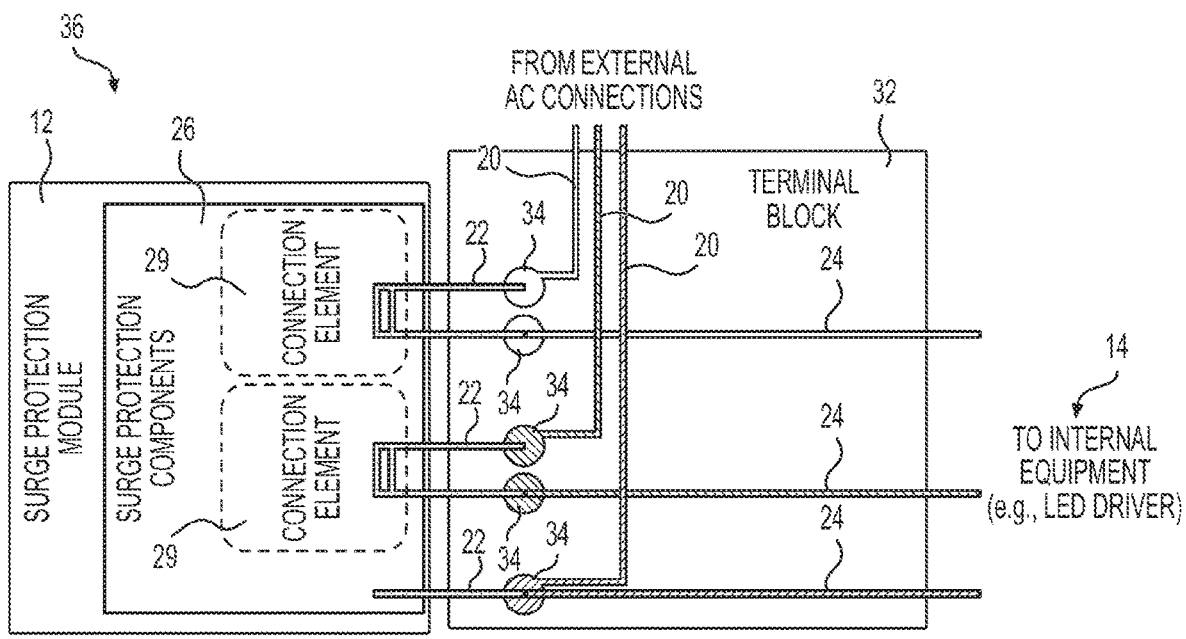
FIG. 4 is a schematic diagram showing an example surge protection module electrically coupled to an example terminal block in another example connection configuration.

FIG. 4 is a schematic diagram showing another example connection configuration 36 including an example surge protection module 12 electrically coupled to an example terminal block 32. In the example shown in FIG. 4, the electrical device 14 is an LED driver 16. Other types of electrical devices are contemplated. The example connection configuration 36 shown in FIG. 4 is a series connection in which three AC input lines 20 from external alternating current connections are electrically coupled to three terminal connections 34, which, in turn, are electrically coupled to three electrical conductors 22 of the example surge protection module 12. Two of the three electrical conductors 22 are electrically coupled to two surge protection components 26 and two connection elements 29, and the output of each of the two surge protection components 26 is electrically coupled via a terminal connection 34 to an electrical conductor 24 coupled to the LED driver circuitry of the LED driver 16. The connection elements 29 may include, for example, wires, fuses, and/or inductors. A third one of the AC input lines 20 is electrically coupled to a third one of the terminal connections 34, which is electrically coupled to an electrical conductor 22 of the surge protection module 12 and to a third electrical conductor 24 coupled to the LED driver circuitry of the LED driver 16. The surge protection components 26 may include, for example, one or more metal oxide varistors (MOVs), gas discharge tubes (GDTs), transient voltage suppression (TVS) diodes, thyristor surge protection devices (TSPDs), fuses, inductors, and/or capacitors. In the example shown in FIG. 4, the surge protection module 12 is coupled directly the terminal block 32. Other coupling strategies are contemplated. The terminal connections 34 may include one or more screw terminals, poke-in connections, insulation displacement, and/or any other form of electrical connections.

FIG. 5 is a schematic diagram showing another example connection configuration 38 including an example surge protection module 12 electrically coupled to an example electrical device 14. In the example shown in FIG. 5, the electrical device 14 includes an LED driver 16 including internal LED driver circuitry 18. Other types of electrical devices are contemplated. The example connection configuration 38 shown in FIG. 5 is a series connection in which three AC input lines 20 from external AC connections are electrically coupled to three terminal connections 34 electrically coupled to the surge protection components 26 and two connection elements 29 of the example surge protection module 12. The outputs of the surge protection module 12 are electrically coupled to three electrical conductors 40, which are electrically coupled to three terminal connections 34 of the LED driver circuitry 18 of the LED driver 16. The connection elements 29 may include, for example, wires, fuses, and/or inductors. A third one of the AC input lines 20 is electrically coupled to a third terminal connection 34 of the surge protection module 12, and to a third terminal connection 34 of the LED driver circuitry 18 of the LED driver 16. The surge protection components 26 may include, for example, one or more metal oxide varistors (MOVs), gas discharge tubes (GDTs), transient voltage suppression (TVS) diodes, thyristor surge protection devices (TSPDs), fuses, inductors, and/or capacitors. The terminal connections 34 may include one or more screw terminals, poke-in connections, insulation displacement, and/or any other form of electrical connections. In the example shown in FIG. 5, the surge protection module 12 is coupled directly the LED driver 16. Other coupling strategies are contemplated. The AC input lines 20 may be connected according to the following connection configurations: line/neutral, line/neutral/ground, line 1/line 2, or line 1/line 2/ground. Although shown with external AC input lines 20, the example shown may be coupled to direct current (DC) input lines, which may be connected according to the following configurations: DC+/DC− or DC+/DC−/ground.

Figure 6C:
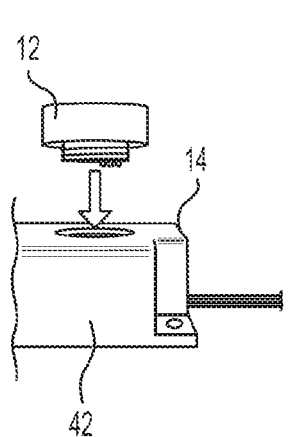
FIG. 6C is a perspective view of an example surge protection module coupled to an example electrical device via an example push-in connection.

FIG. 6A is a perspective view of an example surge protection module 12 coupled to an example electrical device 14. In the example shown in FIG. 6A, the example surge protection module 12 is physically and electrically coupled to the electrical device 14, which may be, for example, an LED driver for an LED lighting fixture. In the example shown, the surge protection module 12 is configured to be coupled directly to a housing 42 of the electrical device 14 in a modular manner, such that the surge protection module 12 is both physically and electrically coupled to the electrical device 14, for example, as explained with respect to FIGS. 6B, 6C, 6D, 7A, 7B, 7C, and 7D.

FIG. 6B is a perspective view of an example surge protection module 12 configured to be coupled to the electrical device 14 according to a screw-in action. For example, a portion of the surge protection module 12 may include external threads 44 configured to threadedly engage internal threads 46 of the housing 42 and facilitate a screw-on engagement between the surge protection module 12 and the housing 42. The surge protection module 12 may include electrical terminals configured to electrically couple to corresponding electrical terminals coupled to the electrical device 14.

FIG. 6C is a perspective view of an example surge protection module 12 coupled to an example electrical device 14 via an example push-in connection. For example, a portion of the surge protection module 12 may include a structure configured to provide a push-in engagement between the surge protection module 12 and the housing 42 of the electrical device 14. The surge protection module 12 may include electrical terminals configured to electrically couple to corresponding electrical terminals coupled to the electrical device 14.

Figure 6D:
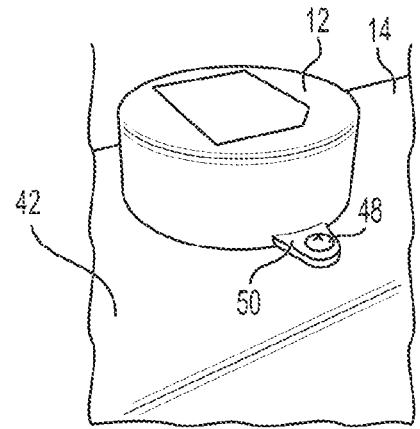
FIG. 6D is a perspective view of an example surge protection module coupled to an example electrical device in an example manner including example fasteners.

FIG. 6D is a perspective view of an example surge protection module 12 coupled to an example electrical device 14 in an example manner including example fasteners 48, such as, for example, screws, bolts, and/or clips. For example, the surge protection module 12 may include one or more flanges 50 having holes configured to receive fasteners 48 for coupling the surge protection module to the electrical device 14. The surge protection module 12 may include electrical terminals configured to electrically couple to corresponding electrical terminals coupled to the electrical device 14.

Figure 7A:
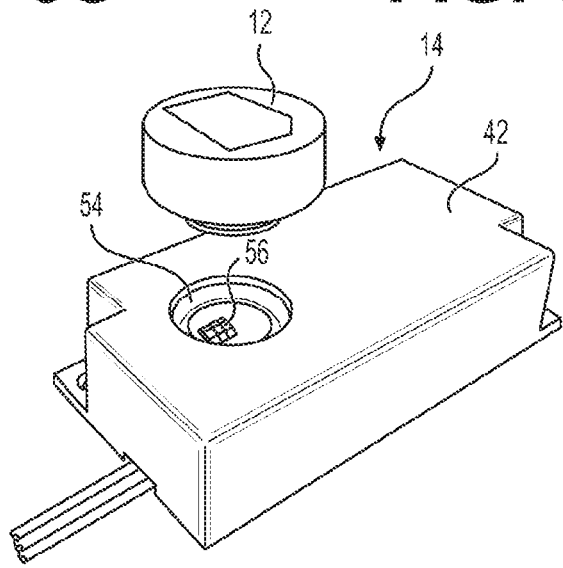
FIG. 7A is a perspective view of an example surge protection module separated from an example electrical device showing an example electrical coupling.

FIG. 7A is a perspective view of an example surge protection module 12 separated from an example electrical device 14 showing an example electrical coupling 52. As shown in FIG. 7A, the housing 42 of the electrical device 14 includes a recess 54 configured to receive a complimentary portion of the surge protection module 12 therein. The electrical device 14 includes terminals 56 configured to electrically couple with complimentary electrical terminals of the surge protection module 12 when the surge protection module 12 is engaged with the electrical device 14.

Figure 7B:
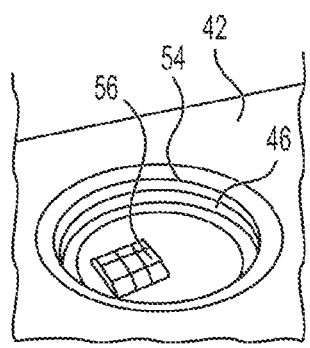
FIG. 7B is a perspective view of an example electrical device showing an example electrical coupling.

FIG. 7B is a perspective view of an example electrical device 14 showing an example electrical coupling 52. The example electrical device 14 shown in FIG. 7B includes a recess 54 including internal threads 46 for engaging complimentary external threaded on a portion of the surge protection module 12. The electrical device 14 shown in FIG. 7B includes terminals 56 configured to electrically couple with complimentary electrical terminals of the surge protection module 12 when the surge protection module 12 is threadedly engaged with the electrical device 14, and the surge protection module is screwed onto the electrical device 14.

Figure 7C:
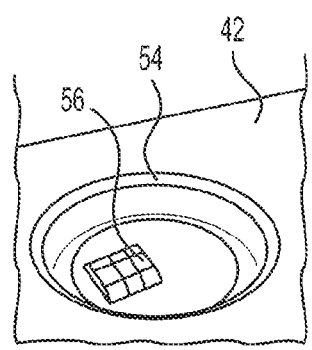
FIG. 7C is a perspective view of another example electrical device showing another example electrical coupling.

FIG. 7C is a perspective view of another example electrical device 14 showing another example electrical coupling 52. As shown in FIG. 7C, the housing 42 of the electrical device 14 includes a recess 54 configured to receive a complimentary portion of the surge protection module 12 therein. The electrical device 14 includes terminals 56 configured to electrically couple with complimentary electrical terminals of the surge protection module 12 when the surge protection module 12 is engaged with the electrical device 14, for example, via a push-in action.

Figure 7D:
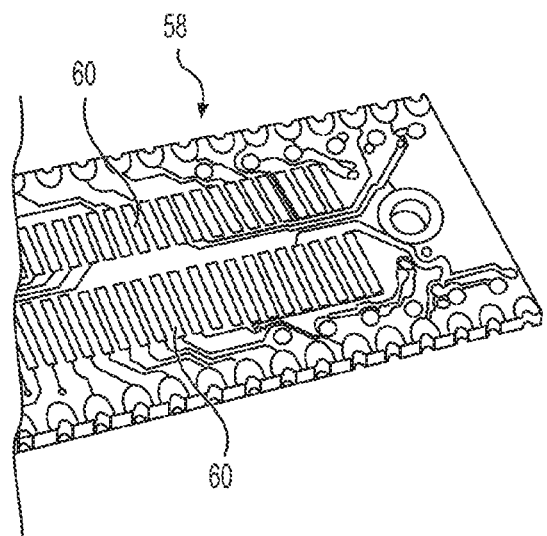
FIG. 7D is a perspective view of another example electrical device showing another example electrical coupling including an example printed circuit board including contact pads.

FIG. 7D is a perspective view of another example electrical coupling 52 including an example printed circuit board 58 including contact pads 60. The example electrical coupling shown in FIG. 7D may be used to electrically couple some examples of the surge protection module 12 with some examples of electrical device 14 when the surge protection module 12 and electrical device 14 are physically coupled to one another.

Figure 8:
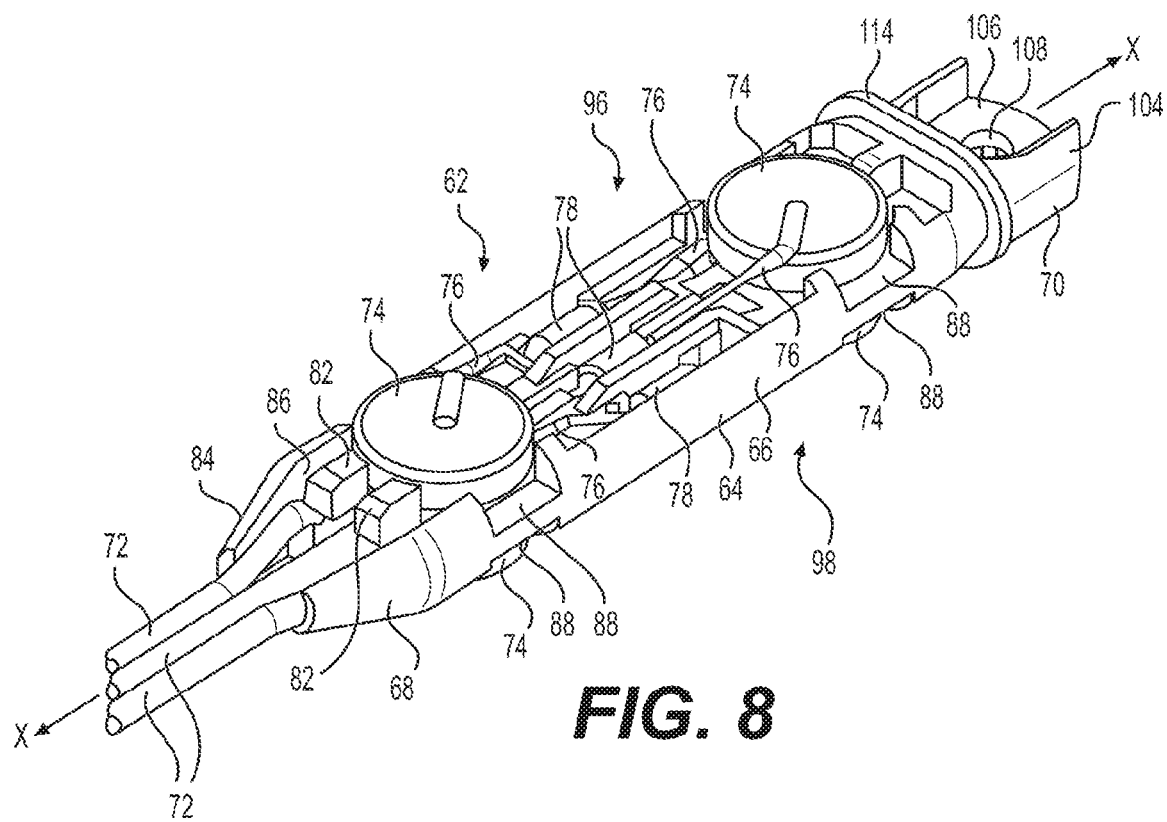
FIG. 8 is a perspective view of an example surge protection module.
Figure 9:
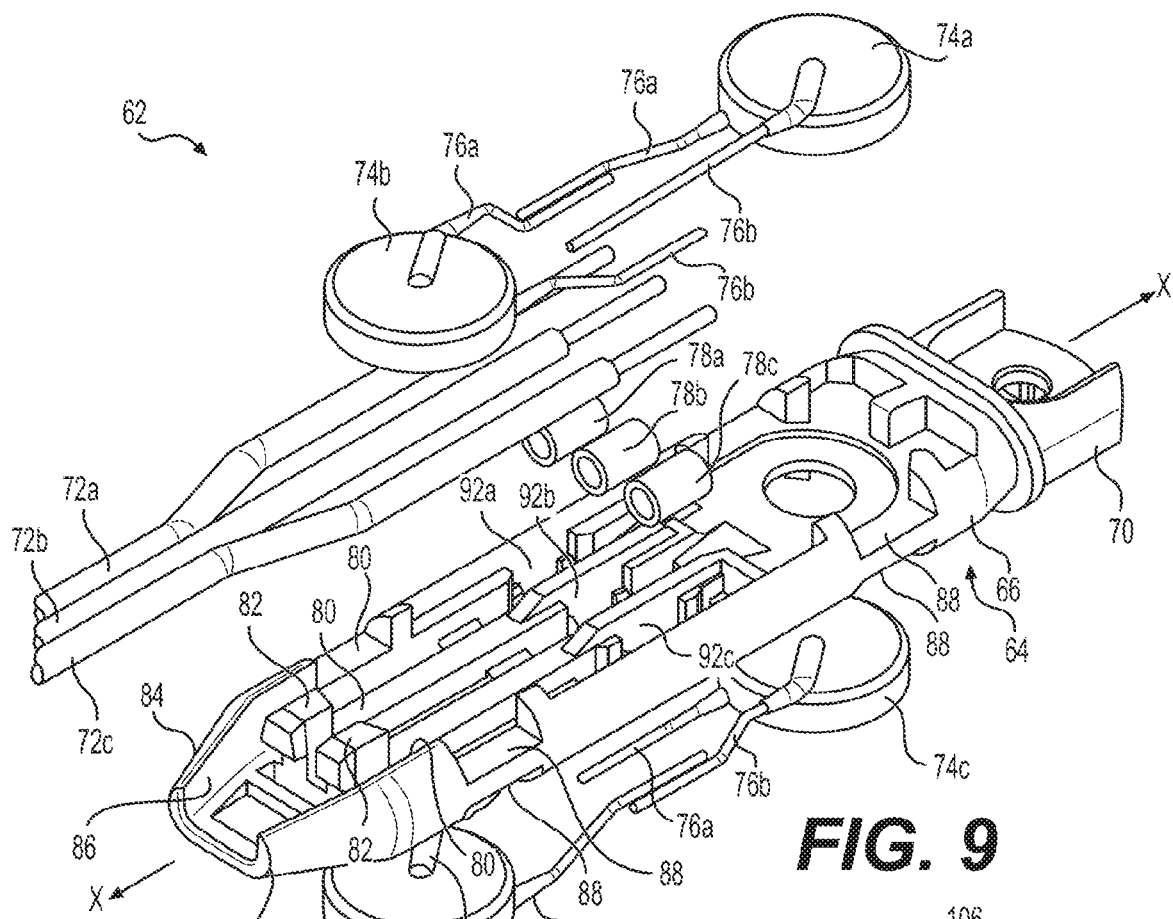
FIG. 9 is an exploded perspective view of the example surge protection module shown in FIG. 8.

FIG. 8 is a perspective view of an example surge protection module 62 configured to limit power surge exposure to an electrical device, for example, as described herein, and FIG. 9 is an exploded perspective view of the example surge protection module 62 shown in FIG. 8. The example surge protection module 62 shown in FIGS. 8 and 9 includes a carrier 64 including a carrier body 66 defining a first end 68 and a second end 70 opposite the first end 68 and a longitudinal axis X extending between the first end 68 and the second end 70. The example surge protection module 62 also includes three electrical conductors 72 (e.g., at least partially electrically insulated wires) coupled to the carrier 64. The surge protection module 62 also includes at least one surge protection component 74 electrically coupled to the electrical conductors 72 and configured to limit power surge conducted to an electrical device to which the electrical conductors 72 are electrically coupled. The example shown in FIGS. 8 and 9 includes four surge protection components 74, although fewer (e.g., three, two, or one) or more surge protection components 74 are contemplated. The surge protection components 26 may include, for example, one or more metal oxide varistors (MOVs), gas discharge tubes (GDTs), transient voltage suppression (TVS) diodes, thyristor surge protection devices (TSPDs), fuses, inductors, and/or capacitors.

In the example shown in FIGS. 8 and 9, each of the surge protection components 74 includes two electrical leads 76, and the surge protection module 62 further includes three lugs 78. Each of the three lugs 78 receives at least one of the electrical conductors 72 and one or more of the two electrical leads 76 of the surge protection components 74 and electrically couples the at least one electrical conductor 72 and the at least one electrical lead 76 to one another. In some examples, as explained herein, the lugs 78 are configured to be pressed onto the at least one electrical conductor 72 and the at least one electrical lead 76, such that the at least one electrical conductor 72 and the at least one electrical lead 74 are electrically coupled to one another and physically coupled to one another. In some examples, the lugs 78 include a tubular member (e.g., a hollow cylindrical member) receiving an end of the at least one electrical conductor 72 and an end of the at least one electrical lead 76.

The example surge protection module 62 shown in FIGS. 8 and 9 includes four surge protection components 74a, 74b, 74c, and 74d. A first surge protection component 74a is electrically coupled to a first electrical conductor 72a and a second electrical conductor 72b. In the example shown, a second surge protection component 74b is electrically coupled to the first electrical conductor 72a and a third electrical conductor 72c. In the example shown, the surge protection module 62 includes three lugs 78a, 78b, and 78c. The first lug 78a receives the first electrical conductor 74a, the first electrical lead 76a of the first surge protection component 74a, and the first electrical lead 76a of the second surge protection component 74b. A second lug 78b receives the second electrical conductor 72b and a second electrical lead 76b of the first surge protection component 74a. In the example shown, a third lug 78c receives the third electrical conductor 72c and a second electrical lead 76b of the second surge protection component 74b.

The example shown in FIGS. 8 and 9 also includes a third surge protection component 74c electrically coupled to two of the electrical conductors 72, and a fourth surge protection component 74d electrically coupled to two of the electrical conductors 72. For example, as shown, the third surge protection component 74c is electrically coupled to the second electrical conductor 72b and the third electrical conductor 74c. In the example shown, the fourth surge protection component 74d is electrically coupled to the first electrical conductor 72a and the third electrical conductor 72c. In the example shown, the second lug 78b receives a first electrical lead 76a of the third surge protection component 74c, and the third lug 78c receives a second electrical lead 76b of the third surge protection component 74c. In addition, the first lug 78a receives a first electrical lead 76a of the fourth surge protection component 74d, and the third lug 78c receives a second electrical lead 76b of the fourth surge protection component 74d.

Figure 10:
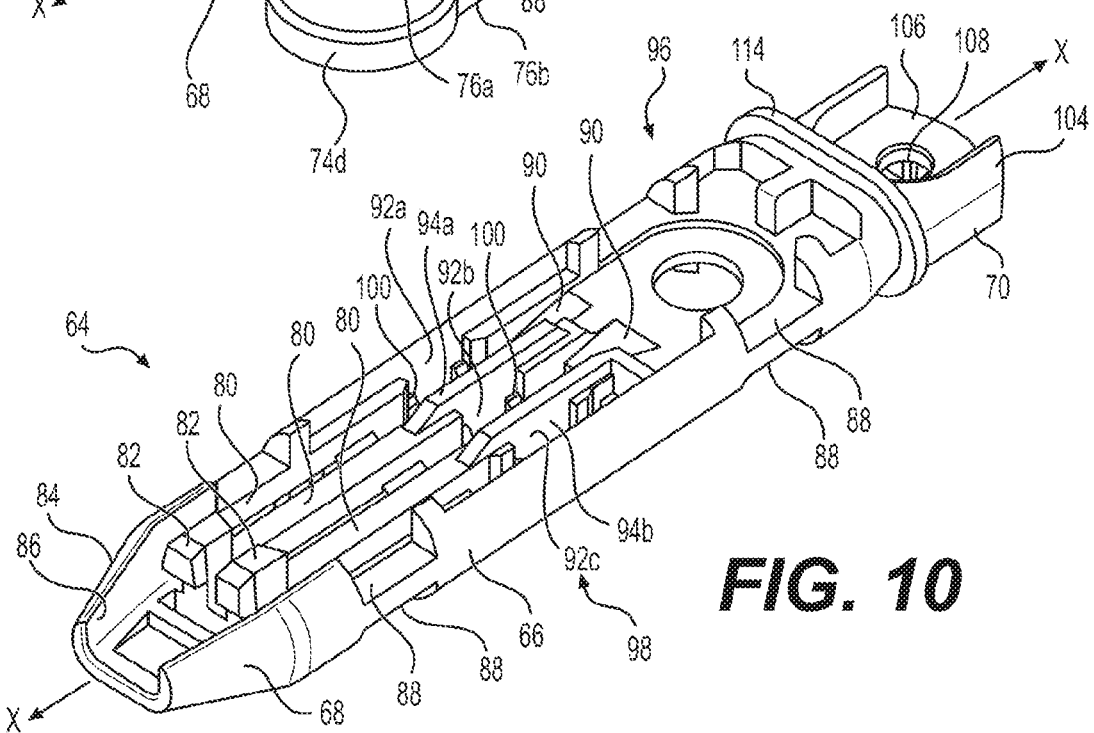
FIG. 10 is a perspective view of an example carrier of a surge protection module.
Figure 11:
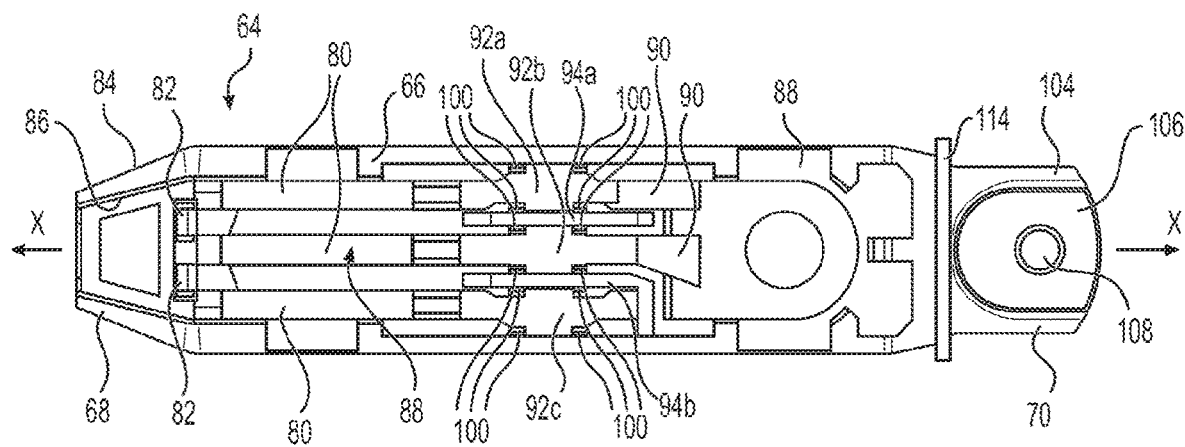
FIG. 11 is a view of a first side of the example carrier shown in FIG. 10.
Figure 12:
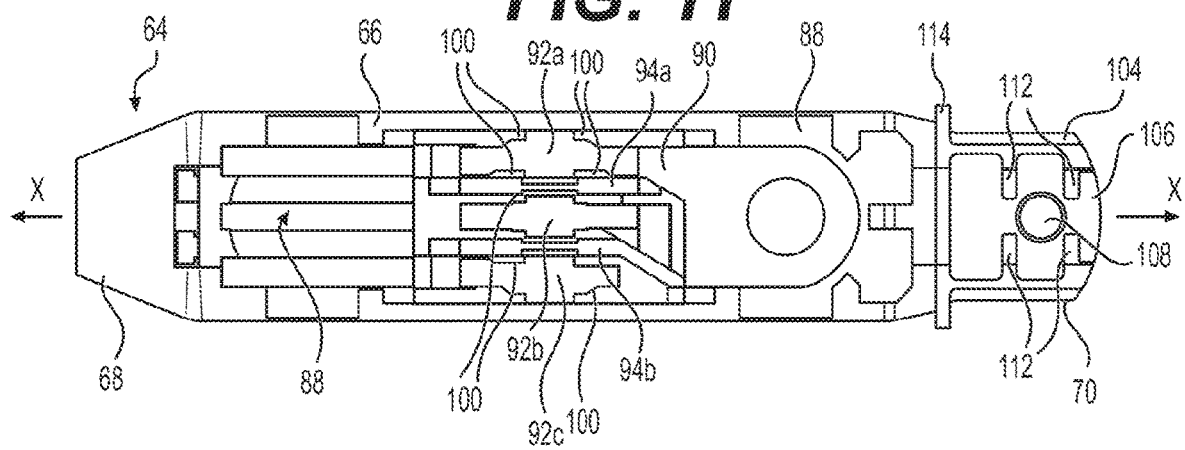
FIG. 12 is a view of a second side of the example carrier shown in FIG. 10.
Figure 13:
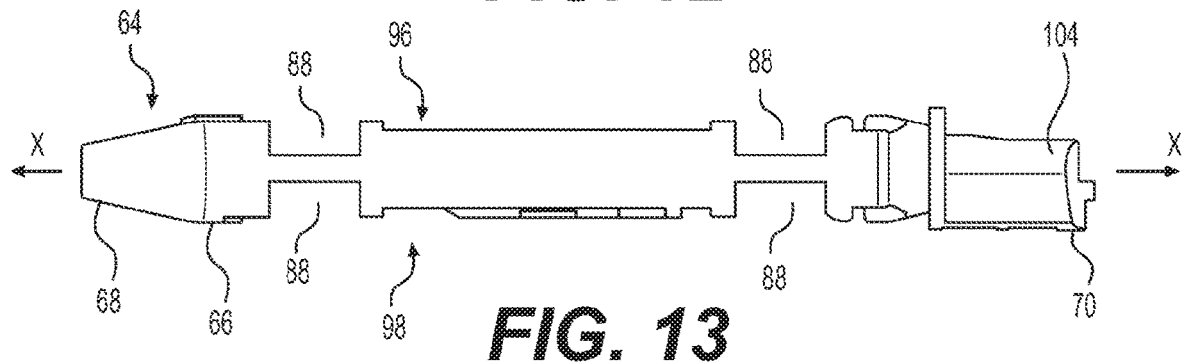
FIG. 13 is a view from a third side of the example carrier shown in FIG. 10.

FIG. 10 is a perspective view of an example carrier 64 of an example surge protection module 62. FIGS. 11-13 show different views of the example carrier 64 shown in FIG. 10. In the example shown, the carrier 64 defines three conductor channels 80 extending from the first end 68 of the carrier 64 toward the second end 70 of the carrier 64. Each of the conductor channels 80 is configured to receive an electrical conductor 72. Some examples may include may include more or fewer conductor channels 80, and the conductor channels 80, in some examples, may receive more than one electrical conductor 72. In the example shown in FIGS. 10-13, one or more of the conductor channels 80 may include a grip 82 configured to engage with an electrical conductor 72. The grip 82 may be defined by the carrier 64 (or incorporated into the carrier 64) and may include a recess having dimensions configured to press tightly against an electrical conductor 72 received in the corresponding conductor channel 80.

As shown in FIGS. 10-13, the first end 68 of the carrier 64 may define an outer surface 84 that tapers in a direction away from the second end 70 of the carrier 64. In some examples, the first end 68 of the carrier 64 may define an inner surface 86 that tapers in a direction away from the second end 70 of the carrier 64, for example, as shown.

As shown in FIGS. 10-13, the example carrier 64 defines a recess 88 configured to receive at least a portion of a surge protection component 74. For example, FIG. 13 shows four recesses 88, each for receiving a portion of respective surge protection components 74. In the example shown, some of the recesses 88 are located between the conductor channels 80 and the second end 70 of the carrier 64.

In the example shown in FIGS. 10-13, the carrier 64 defines lead channels 90 extending between the recesses 88 and the conductor channels 80. The lead channels are configured to receive electrical leads 76 of the surge protection components 74.

As shown in FIGS. 10-13, the carrier 64 may define pockets 92, each configured to receive a lug 78 electrically coupling and physically coupling one of the electrical conductors 72 to one or more electrical leads 76 the surge protection components 74. In some examples, the pockets 92 may include a first pocket 92a for receiving a first lug 78a, a second pocket 92b adjacent the first pocket 92a for receiving a second lug 78b, and a third pocket 92c adjacent the second pocket 92b for receiving a third lug 78c. In some examples, the carrier 64 may also include pocket barriers 94 between adjacent pockets 92, for example, a first pocket barrier 94a between the first pocket 92a and the second pocket 92b, and a second pocket barrier 94b between the second pocket 92b and the third pocket 92c. The packet barriers 94 may serve to separate (e.g., electrically insulate) the first lug 78a, the second lug 78b, and the third lug 78c from one another.

In some examples, for example, as shown in FIGS. 10-13, the pockets 92 pass through the carrier 64, for example, from a first side 96 of the carrier 64 to a second side 98 of the carrier 64. In such examples, the pockets 92 may define at least one tab 100 configured to prevent a lug 78 received in the pocket 92 from passing through the carrier 64 (e.g., falling out of the carrier 64). This example configuration may facilitate pressing the lugs 78 to crimp them tightly around any electrical conductors 72 and/or electrical leads 76 of the surge protection components 74 received in the lugs 78, for example, as explained herein.

FIGS. 14 and 15 show two views of another example carrier 64 that omits outside barriers adjacent the outboard pockets 92 (i.e., the pockets 92a and 92c). This example configuration provides a lower profile relative to the example carrier 64 shown in FIGS. 10-13. The example shown in FIGS. 14 and 15 also includes the pocket barriers 94 discussed with respect to FIGS. 10-13. The pocket barriers 94 may provide electrical clearance (e.g., insulation) to help meet or exceed certain electrical regulatory rules (e.g., codes).

Figure 16:
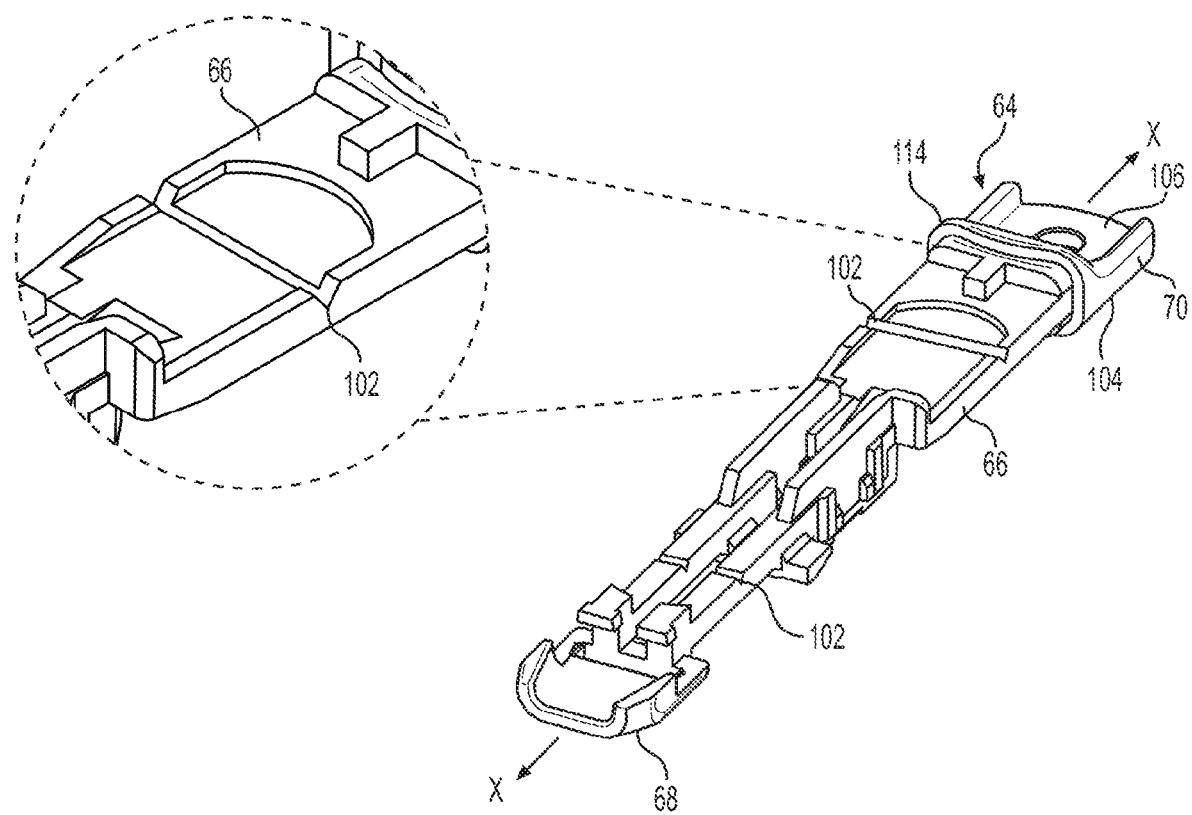
FIG. 16 is a perspective view of another example carrier with a detailed view of an example notch configured to facilitate separation of different portions of the carrier from one another.
Figure 17A:
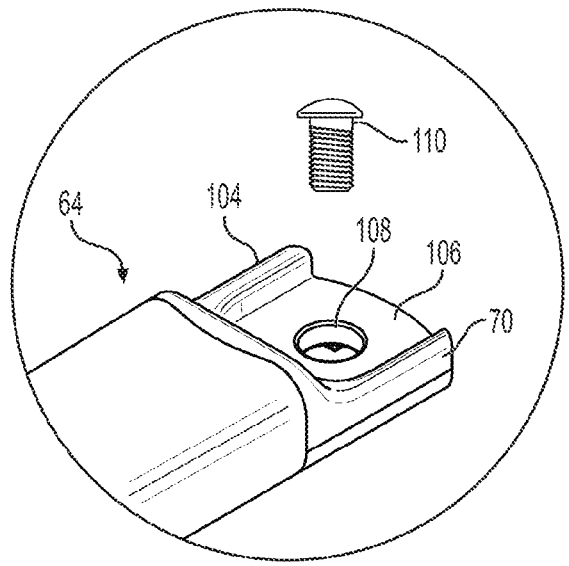
FIG. 17A is a partial perspective view of an example surge protection module including an example mounting boss configured to facilitate mounting of the surge protection module to a support.
Figure 17B:
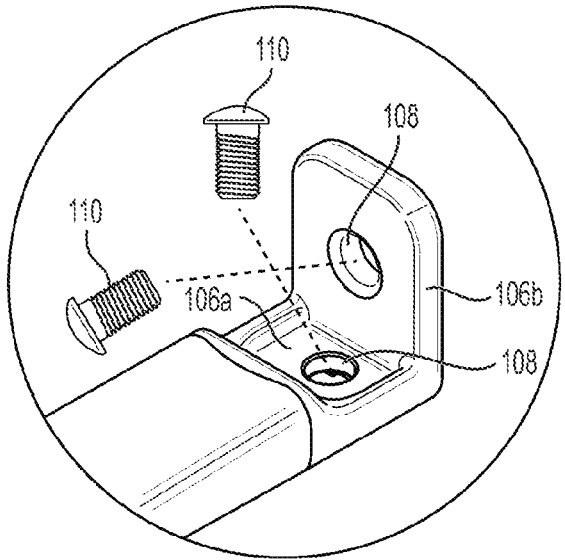
FIG. 17B is a partial perspective view of another example surge protection module including another example mounting boss configured to facilitate mounting of the surge protection module to a support.
Figure 17C:
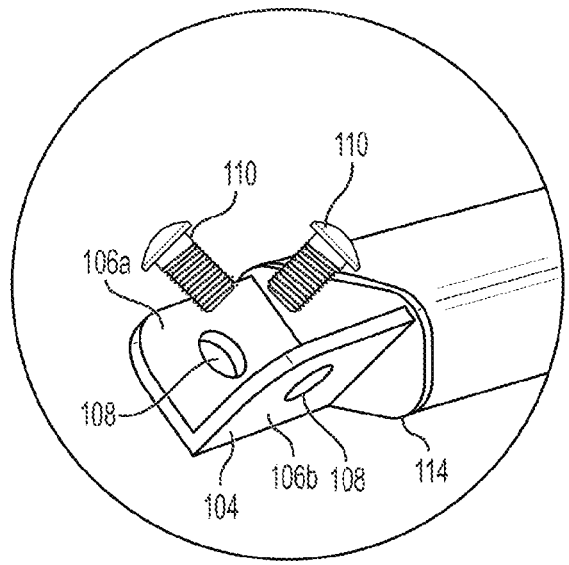
FIG. 17C is a partial perspective view of a further example surge protection module including a further example mounting boss configured to facilitate mounting of the surge protection module to a support.
Figure 17D:
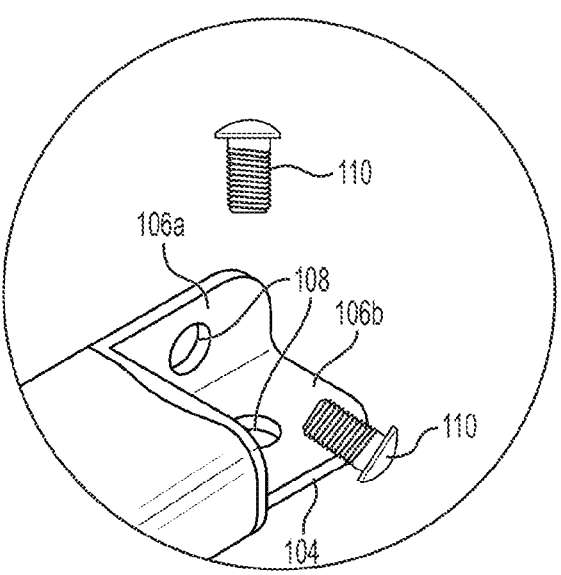
FIG. 17D is a partial perspective view of another example surge protection module including another example mounting boss configured to facilitate mounting of the surge protection module to a support.

FIG. 16 is a perspective view of another example carrier 64 with a detailed view of an example notch 102 configured to facilitate separation of different portions of the carrier 64 from one another. For example, the example carriers 64 shown in FIGS. 10-16 include a second end 70 defining a mounting boss 104 configured to facilitate mounting of the surge protection module 62 to a support. For example, the carrier 64 may define a notch 102 between the mounting boss 104 and a remainder of the carrier 64, and the notch 102 may be configured to facilitate separation of the mounting boss 104 from the remainder of the carrier 64. In some examples, the mounting boss 104 may be separated from the remainder of the carrier 64 by using a cutting device or by hand. In some examples, for example, as shown in FIGS. 10-16, the mounting boss 104 defines a flange 106 defining a mounting hole 108 configured to receive a fastener for mounting the surge protection module 62 to a support.

FIG. 17A, 17B, 17C, and 17D are partial perspective views of examples of surge protection module 62 including examples of mounting bosses 104 configured to facilitate mounting of the surge protection module 62 to a support. In some examples, the flange 106 defines a plane extending substantially parallel with respect to the longitudinal axis X of the carrier 64, obliquely with respect to longitudinal axis X of the carrier 64, or substantially perpendicular with respect to the longitudinal axis X of the carrier 64 (see, e.g., FIG. 17B). In some examples, the mounting boss 104 includes a first flange 106a and a second flange 106b, each defining respective mounting holes 108a and 108b configured to receive a fastener 110 for mounting the surge protection module 62 to a support (see, e.g., FIGS. 17B-17D). Each of the first flange 106a and the second flange 106b may define a flange plane, and the flange plane of first flange 106a and the flange plane of the second flange 106b may be at an angle with respect to one another (e.g., a non-zero angle, such as, for example, an angle of about 30 degrees, an angle of about 45 degrees, an angle of about 60 degrees, an angle of about 90 degrees, an angle of about 120 degrees, an angle of about 135 degrees, or an angle of about 150 degrees).

In the example carrier 64 shown in FIGS. 10-13, the mounting boss 104 includes reinforcement ribs 112 configured to strengthen the mounting boss 104. In the example carriers 64 shown in FIGS. 10-16, the carrier 64 defines a flange 114 at the second end 70 of the carrier 64 and configured to provide a stop for an insulation sleeve, for example, as described herein with respect to FIG. 32. For example, the flange 114 may prevent the insulation sleeve from extending over the mounting boss 104. For example, in examples having an insulation sleeve, the insulation sleeve may be pushed from the first end 68 of the carrier 64, over the carrier 64 until the leading end of the insulation sleeve abuts the flange 114.

Figure 18:
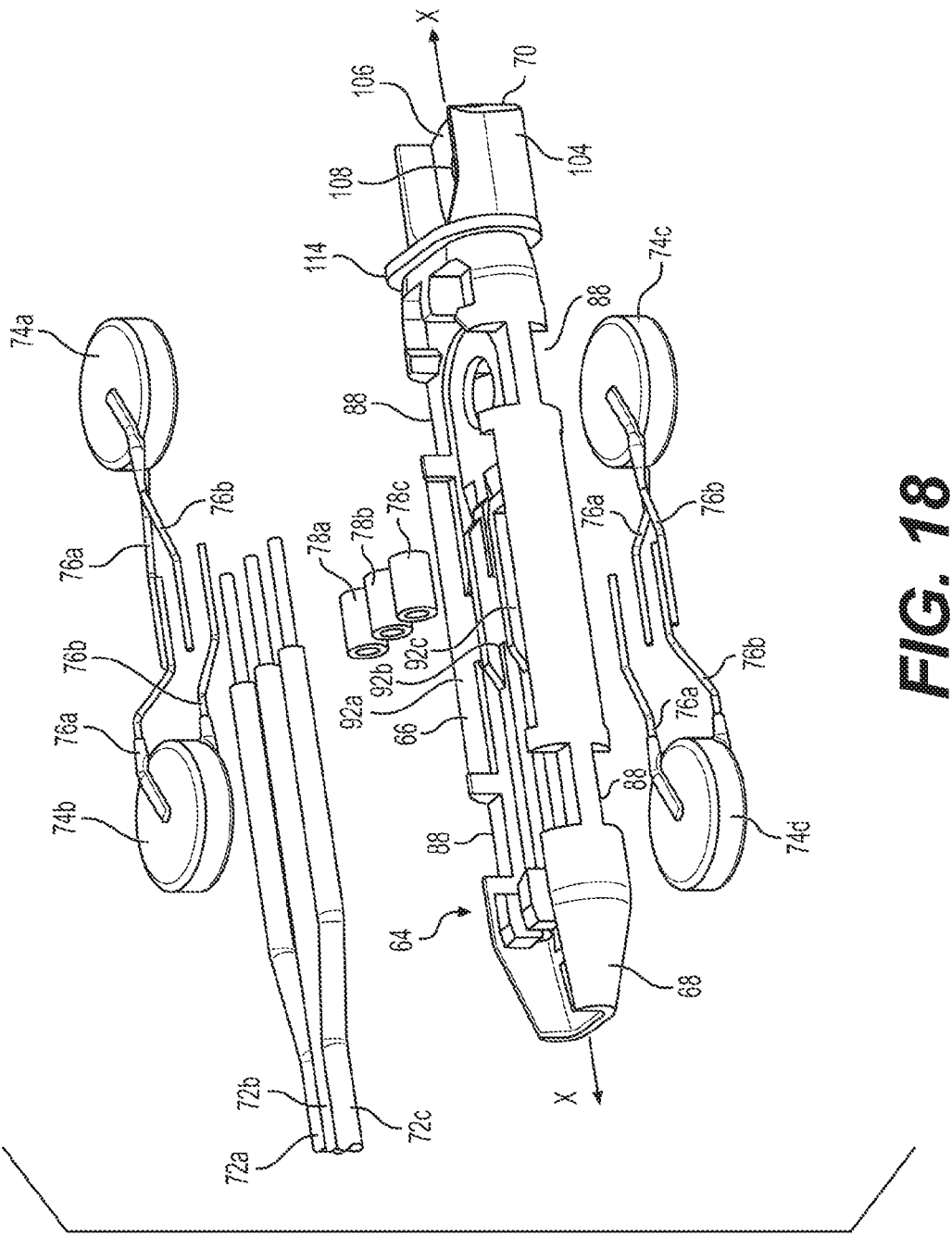
FIG. 18 is an exploded perspective view of the example surge protection module including an example carrier, example lugs, example electrical conductors, and example surge protection components including example electrical leads.

FIG. 18 is an exploded perspective view of the example surge protection module 62 including an example carrier 64, example lugs 78, example electrical conductors 72, and example surge protection components 74 including example electrical leads 76. The example shown in FIG. 18 is similar to the example shown in FIGS. 8 and 9. The example surge protection module 62 shown in FIG. 18 includes a carrier 64 including a carrier body 66 defining a first end 68 and a second end 70 opposite the first end 68 and a longitudinal axis X extending between the first end 68 and the second end 70. The example surge protection module 62 also includes three electrical conductors 72 (e.g., at least partially electrically insulated wires) coupled to the carrier 64. The surge protection module 62 also includes at least one surge protection component 74 electrically coupled to the electrical conductors 72 and configured to limit power surge conducted to an electrical device to which the electrical conductors 72 are electrically coupled. The example shown in FIG. 18 includes four surge protection components 74, although fewer (e.g., three, two, or one) or more surge protection components 74 are contemplated. The surge protection components 26 may include, for example, one or more metal oxide varistors (MOVs), gas discharge tubes (GDTs), transient voltage suppression (TVS) diodes, thyristor surge protection devices (TSPDs), fuses, inductors, and/or capacitors.

In the example shown in FIG. 18, each of the surge protection components 74 includes two electrical leads 76, and the surge protection module 62 further includes three lugs 78. Each of the three lugs 78 receives at least one of the electrical conductors 72 and one or more of the two electrical leads 76 of the surge protection components 74 and electrically couples the at least one electrical conductor 72 and the at least one electrical lead 76 to one another. In some examples, as explained herein, the lugs 78 are configured to be pressed onto the at least one electrical conductor 72 and the at least one electrical lead 76, such that the at least one electrical conductor 72 and the at least one electrical lead 74 are electrically coupled to one another and physically coupled to one another. In some examples, the lugs 78 include a tubular member (e.g., a hollow cylindrical member) receiving an end of the at least one electrical conductor 72 and an end of the at least one electrical lead 76.

The example surge protection module 62 shown in FIG. 18 includes four surge protection components 74a, 74b, 74c, and 74d. A first surge protection component 74a is electrically coupled to a first electrical conductor 72a and a second electrical conductor 72b. In the example shown, a second surge protection component 74b is electrically coupled to the first electrical conductor 72a and a third electrical conductor 72c. In the example shown, the surge protection module 62 includes three lugs 78a, 78b, and 78c. The first lug 78a receives the first electrical conductor 74a, the first electrical lead 76a of the first surge protection component 74a, and the first electrical lead 76a of the second surge protection component 74b. A second lug 78b receives the second electrical conductor 72b and a second electrical lead 76b of the first surge protection component 74a. In the example shown, a third lug 78c receives the third electrical conductor 72c and a second electrical lead 76b of the second surge protection component 74b.

The example shown in FIG. 18 also includes a third surge protection component 74c electrically coupled to two of the electrical conductors 72, and a fourth surge protection component 74d electrically coupled to two of the electrical conductors 72. For example, as shown, the third surge protection component 74c is electrically coupled to the second electrical conductor 72b and the third electrical conductor 74c. In the example shown, the fourth surge protection component 74d is electrically coupled to the first electrical conductor 72a and the third electrical conductor 72c. In the example shown, the second lug 78b receives a first electrical lead 76a of the third surge protection component 74c, and the third lug 78c receives a second electrical lead 76b of the third surge protection component 74c. In addition, the first lug 78a receives a first electrical lead 76a of the fourth surge protection component 74d, and the third lug 78c receives a second electrical lead 76b of the fourth surge protection component 74d.

FIGS. 19A, 19B, and 19C are a perspective view, top view, and side view, respectively, of an example surge protection component 74 including two electrical leads 76a and 76b having example bends 116. The example bends 116 in the example shown in FIGS. 19A-19C are configured to facilitate coupling of the electrical leads 76a and 76b to the first and third electrical conductors 72a and 72c, for example, as shown in FIGS. 8, 9, and 18. In some examples, the example bends 116 of the electrical leads 76a and 76b are configured such that when the surge protection component 74 is positioned in a recess 88 of the carrier 64, the remote ends 118 of the electrical leads 76a and 76b lie in a common plane and have respective longitudinal axes that are aligned with the corresponding first and third lugs 78a and 78c.

FIGS. 20A, 20B, and 20C are a perspective view, top view, and side view, respectively, of an example surge protection component 74 including two electrical leads 76a and 76b having example bends 116. The example bends 116 in the example shown in FIGS. 20A-20C are configured to facilitate coupling of the electrical leads 76a and 76b to either the first and second electrical conductors 72a and 72b or the second and third electrical conductors 72b and 72c, for example, as shown in FIGS. 8, 9, and 18. In some examples, the example bends 116 of the electrical leads 76a and 76b are configured such that when the surge protection component 74 is positioned in a recess 88 of the carrier 64, the remote ends 118 of the electrical leads 76a and 76b lie in a common plane and have respective longitudinal axes that are aligned with the corresponding first and second lugs 78a and 78b or second and third lugs 78b and 78c.

Figure 21:
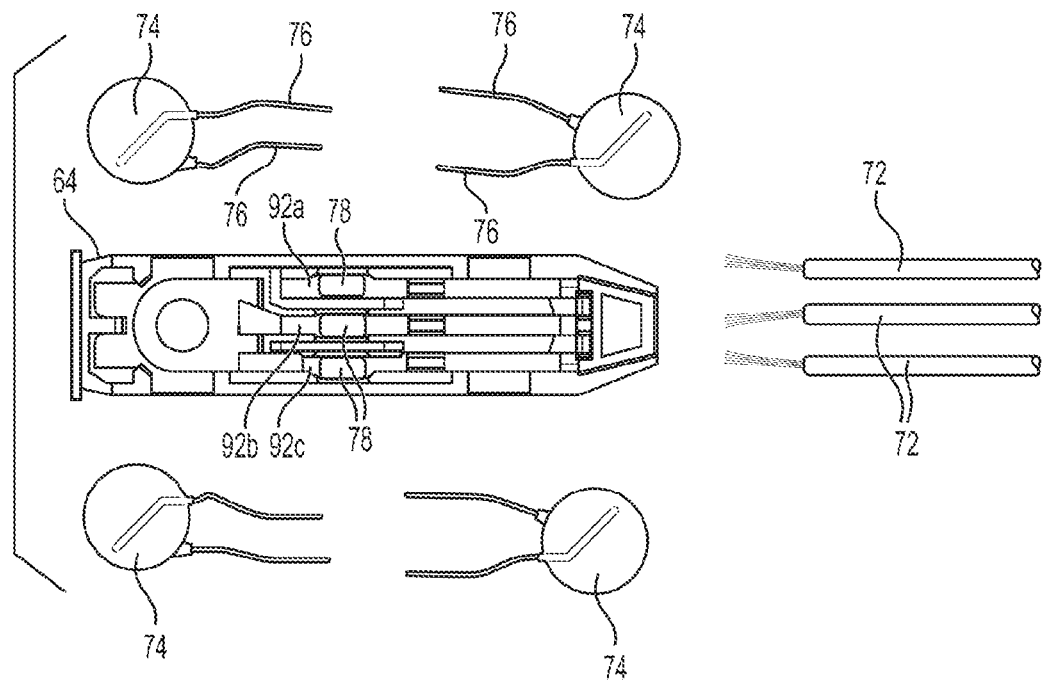
FIG. 21 is a view of an example carrier, example lugs, example electrical conductors, and example surge protection components laid out for assembly.

FIG. 21 is a view of an example carrier 64, example lugs 78, example electrical conductors 72, and example surge protection components 74 laid out for assembly.

Figure 22:
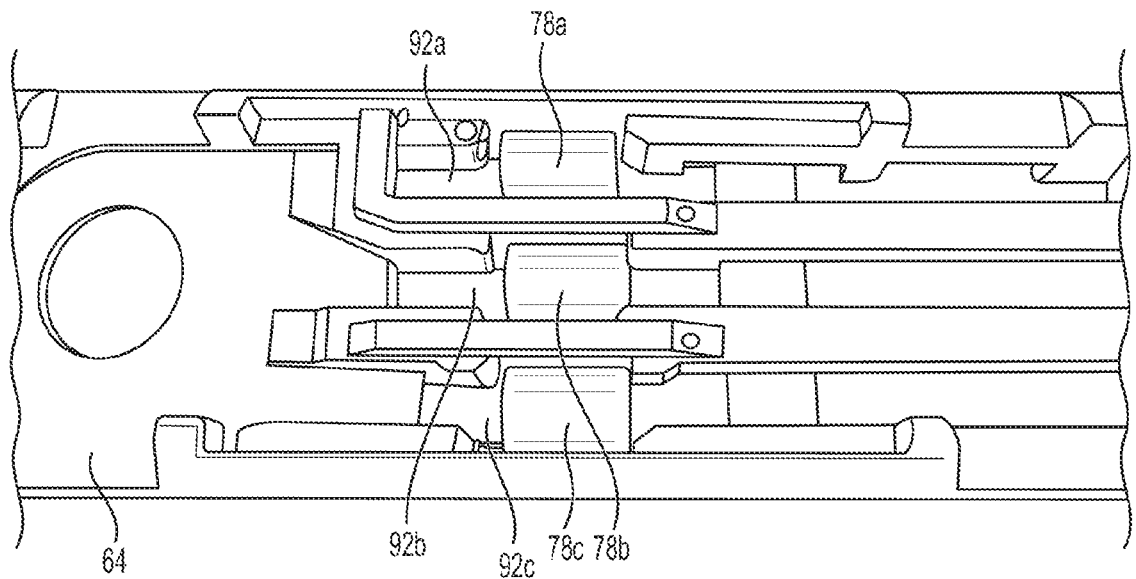
FIG. 22 is a view of example lugs provided in example pockets of an example carrier for assembly of an example surge protection module.

FIG. 22 is a view of example lugs 78 provided in example pockets 92 of an example carrier 64 for assembly of an example surge protection module 62. In the example shown, the lugs 78 have been placed in the pockets 92, which pass through the carrier 64 and include tabs 100 to prevent the lugs 78 from dropping through the pockets 92 and separating from the carrier 64. The tabs 100, in some examples, may act to position the lugs 78 longitudinally with respect to the carrier 64. In the example shown, the carrier 64 also includes pocket barriers 94 to separate (e.g., electrically insulate) the lugs 78 from one another.

Figure 23:
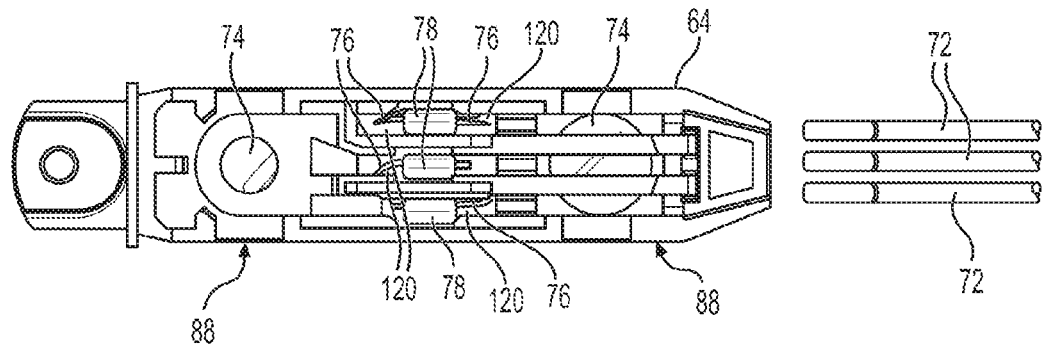
FIG. 23 is a view of two example surge protection components provided in example recesses on a second side of an example carrier, with example electrical leads of the surge protection components passing through respective example openings for facilitating passage of the electrical leads from the second side of the carrier to the first side of the carrier, and with the electrical leads provided in the hollow spaces of the three lugs according to an example construction.

FIG. 23 is a view of two example surge protection components 74 provided in example recesses 88 in the second side 98 (e.g., the underside as shown) of the example carrier 64, with example electrical leads 76 of the surge protection components 74 passing through respective example openings 120 for facilitating passage of the electrical leads 76 from the second side 98 of the carrier 64 to the first side 96 (e.g., the upper side as shown) of the carrier 64, and with the electrical leads 76 provided in the hollow spaces of the three lugs 78 according to an example construction. After the lugs 78 have been placed in the pockets 92, each of the surge protection components 74 is placed in a respective recess 88 on the second side 98 of the carrier 64, such that the electrical leads 76 pass through the carrier 64 to the first side 96 and into the appropriate lugs 78, for example, as shown.

Figure 24:
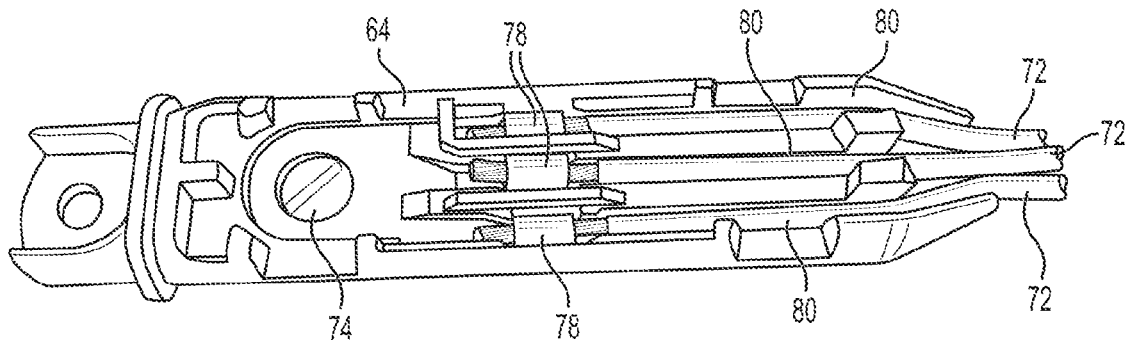
FIG. 24 is a view showing three example electrical conductors provided in the respective hollow spaces of the three lugs with the electrical leads of the two surge protection components and with the three electrical conductors received in example conductor channels.

FIG. 24 is a view showing three example electrical conductors 72, having respective insulation removed from the remote ends, provided in the respective hollow spaces of the three lugs 78, with the electrical leads 76 of the two surge protection components 74 and the three electrical conductors 72 received in example conductor channels 80 of the carrier 64.

Figure 25:
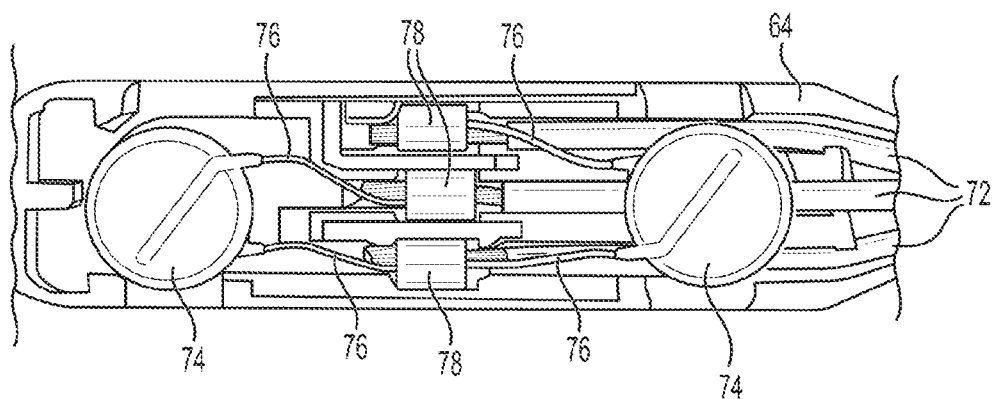
FIG. 25 is a view showing third and fourth example surge protection components received in respective third and fourth example recesses in the carrier with the respective electrical leads of the third and fourth surge protection components provided in the hollow spaces of the three lugs.

FIG. 25 is a view showing third and fourth example surge protection components 74 received in respective third and fourth example recesses 88 in the carrier 64 with the respective electrical leads 76 of the third and fourth surge protection components 74 provided in the hollow spaces of the three lugs 78. Each of the third and fourth surge protection components 74 is placed in a respective recess 88 on the first side 96 of the carrier 64, such that the electrical leads 76 are received in the appropriate lugs 78, for example, as shown.

Figure 26:
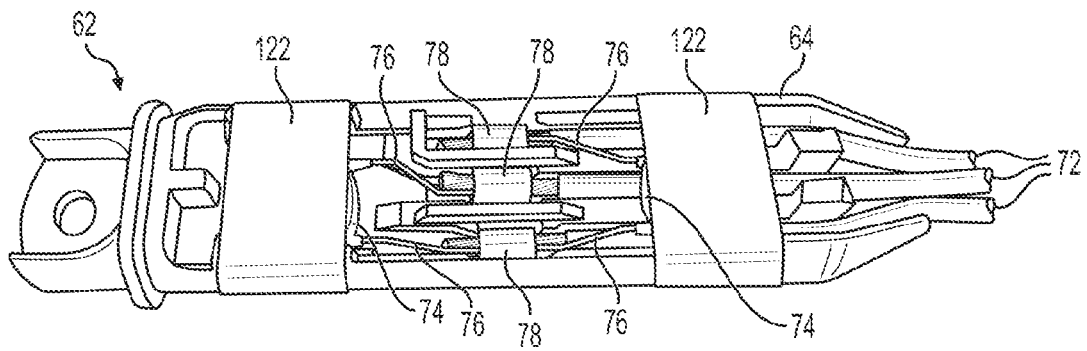
FIG. 26 is a perspective view showing example bands for securing the first, second, third, and fourth surge protection components to the carrier.

FIG. 26 is a perspective view showing example bands 122 for securing the first, second, third, and fourth surge protection components 76 to the carrier 64. After the electrical conductors 72 and the surge protection components 74 have been assembled relative to the carrier 64 using the lugs 78, the surge protection components 74 may be secured in place using the bands 122, which may be tape. This prevents unintended separation of the parts from the carrier 64 during movement of the carrier 64 and associated parts, for example, for the pressing process explained herein.

Figure 27:
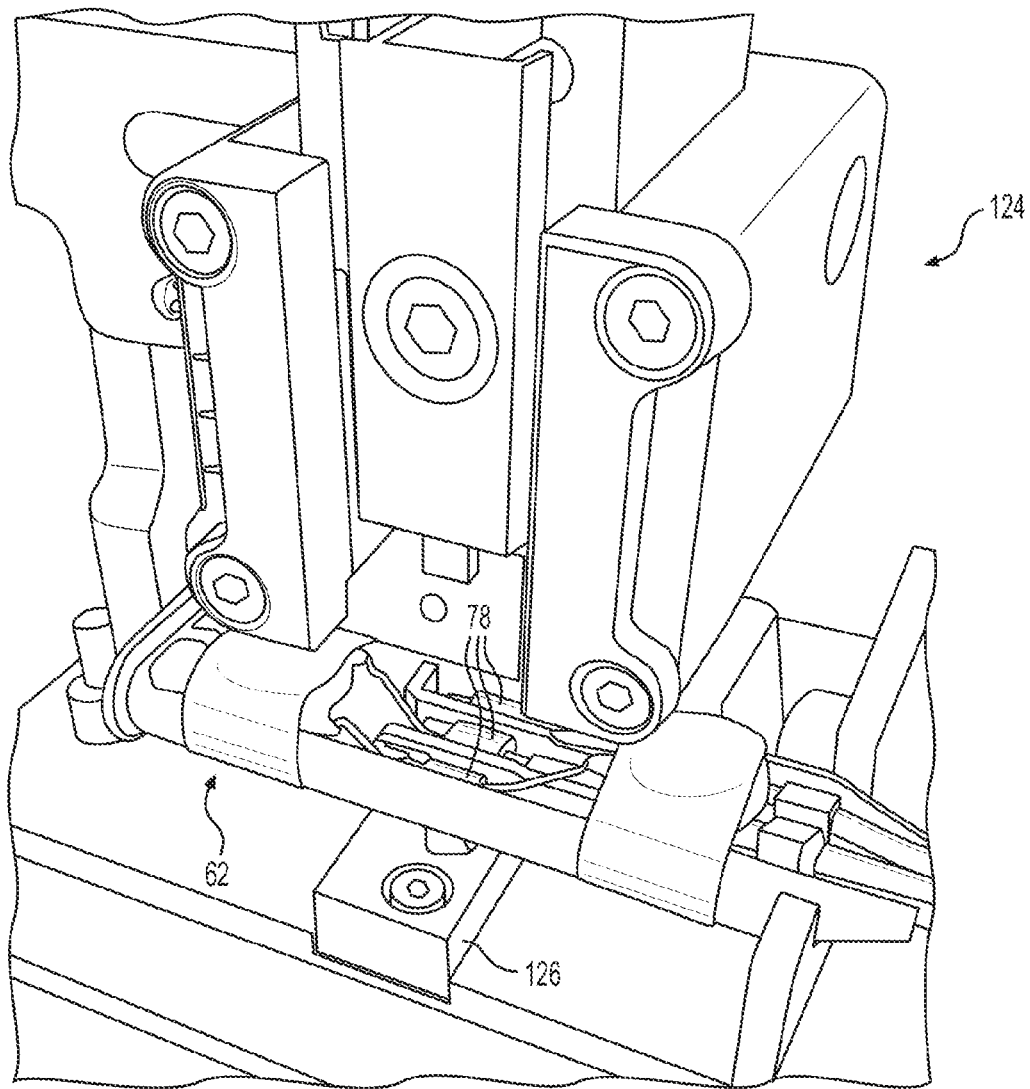
FIG. 27 is a perspective view of an example partially assembled surge protection module shown in FIG. 26 provided in an example press configured to press the three respective lugs such that the lugs are crimped onto the electrical leads of the first, second, third, and fourth surge protection components, and the three electrical conductors, such that they are physically coupled and electrically coupled to one another.

FIG. 27 is a perspective view of the example partially assembled surge protection module 62 shown in FIG. 26 provided in an example press 124 configured to press the three respective lugs 78, such that the lugs 78 are crimped onto the electrical leads 76 of the first, second, third, and fourth surge protection components 74, and the three electrical conductors 72, such that they are physically coupled and electrically coupled to one another. FIG. 27 shows the partially assembled surge protection module 62 positioned on a lower die set 126 of the press 124. In some examples, the carrier may be positioned in the lower die set 126 prior to providing the one or more surge protection components 74.

Figure 28:
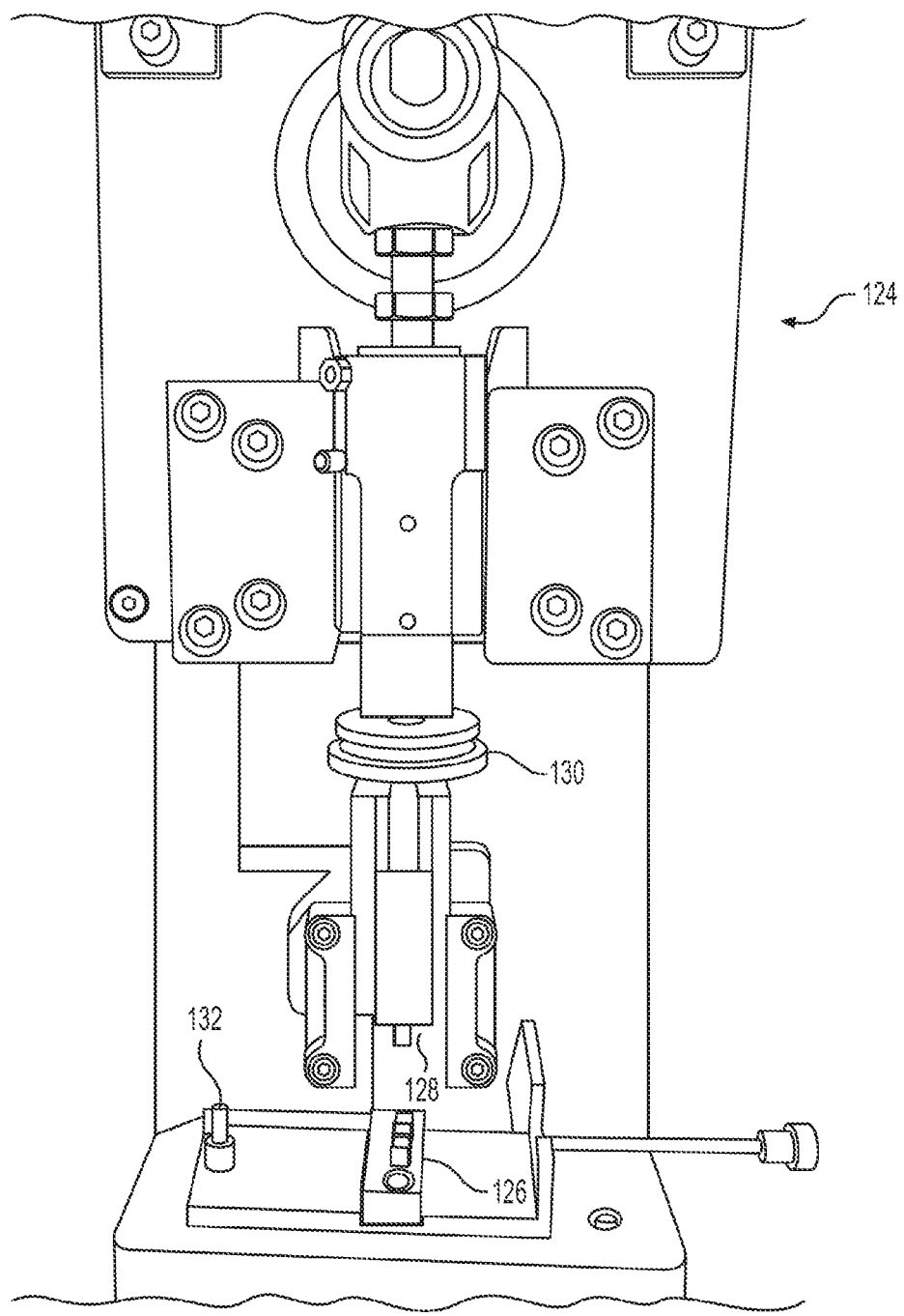
FIG. 28 is a perspective view of the example press shown in FIG. 27.

FIG. 28 is a perspective view of the example press 124 shown in FIG. 27. The example press 124 shown includes the lower die set 126 and an upper die set 128 configured to press the lugs 78 between the lower die set 126 and the upper die set 128, such that the lugs 78 are crimped onto the electrical leads 78 of the first, second, third, and fourth surge protection components 74, and the three electrical conductors 72. The example press 124 includes a pressure dial 130 for adjusting the force applied to the upper die set 128 and the lower die set 126, and thus, to the lugs 78 during a pressing operation. In some examples, the press 124 may be a 2-ton press (e.g., a pedal-operated press), although other types and/or sizes of presses are contemplated. The example 124 also includes a locator pin 132 for positioning the partially assembled surge protection module 62 prior to pressing.

Figure 29:
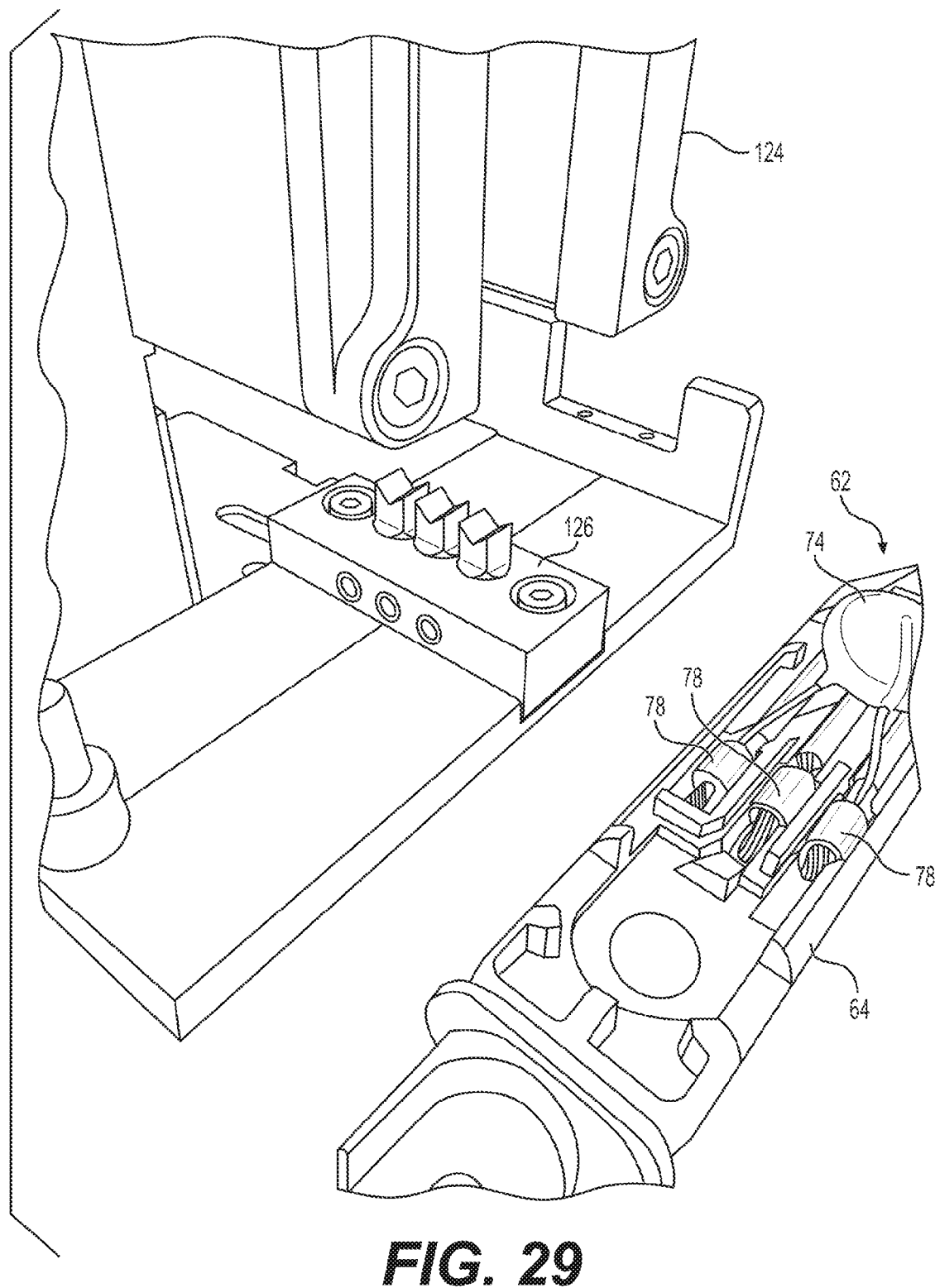
FIG. 29 is a perspective view of showing example lower dies of the example press and an example surge protection module (excluding a surge protection component for ease of viewing) following pressing including crimped lugs having respective substantially rectangular cross-sectional shapes following crimping.

FIG. 29 is a perspective view of showing the example lower die set 126 of the example press 124 and an example surge protection module 62 (with one of the surge protection components 74 removed for ease of viewing) following pressing, including crimped lugs 78 having respective substantially rectangular cross-sectional shapes following crimping. For example, in some examples, the lugs 78 after crimping may have a substantially square-shaped or diamond-shaped cross-sectional shape following the pressing operation. In some examples, the final cross-section crimp shape may result in reducing at least one dimension of the overall crimp cross-section (e.g., from a pre-pressing diameter crimp of about 5.4 mm to about 5.0 mm at its widest cross-section dimension). For example, the crimping cross-section may result in compaction on both width and height of the cross-section. This may reduce the likelihood in some example of cracking the carrier 64 when crimping the lugs 78, which might occur if the pressing caused an expansion of the crimping cross-section (e.g., a flattening and widening of the crimping cross-section).

Figure 30:
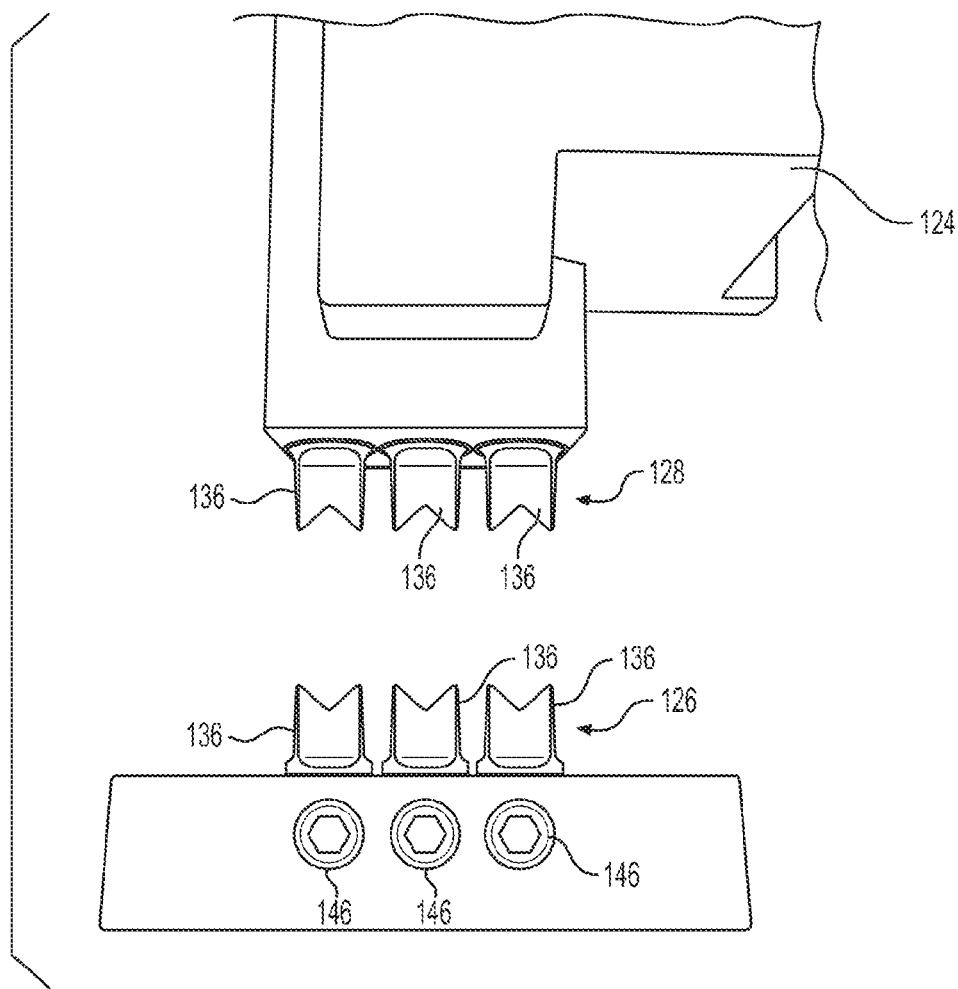
FIG. 30 shows a view of example upper dies and corresponding example lower dies in respective die holders for the example press shown in FIGS. 27-29.

FIG. 30 shows a view of example upper die set 128 and corresponding example lower die set 126 in respective die holders 134 for the example press 124 shown in FIGS. 27-29. In some examples, the lower die set 126 and/or the upper die set 128 may each include three individual dies 136 that may be independently removeable from the respective die set.

Figure 31:
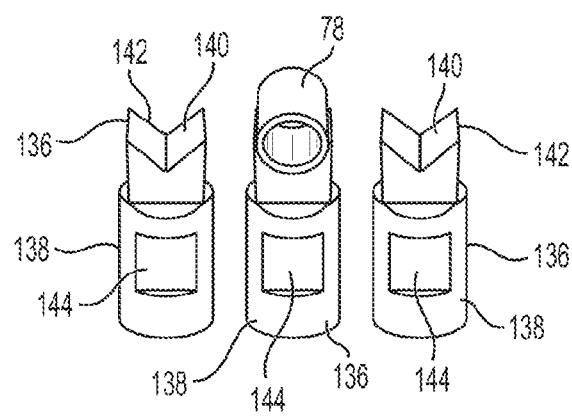
FIG. 31 is a detailed perspective view of three example dies removed from a die holder to show details of the example dies, including example dimensions relative to an example lug.

FIG. 31 is a detailed perspective view of three example dies 136 removed from a die holder 134 to show details of the example dies 136, including example dimensions relative to an example lug 78. As shown in FIG. 31, the example dies 136 include a core 138 and a die face 140 having a concave relief 142 (e.g., a triangular relief defining an apex and opposing obliquely-extending sides). The core 138 of the dies 136 may include a flat 144 configured to be engaged by a set screw 146 (see FIG. 30) for securing the dies 136 in the die holder 134. As shown in FIG. 31, the example dies 136 have die faces 140 dimensioned and shaped to crimp the lugs 78, such that the electrical leads 78 of the first, second, third, and fourth surge protection components 74, and the three electrical conductors 72, are physically coupled and electrically coupled to one another in a secure manner. Although the dies 136 for the upper die set 128 and the lower die set 126 are of the same configuration in the example shown, one or more of the upper dies 136 may have a configuration differing from one or more of the lower dies 136. In some examples, one or more of the die faces 140 may result in a final cross-section crimp shape that has at least one reduced dimension of the overall crimp cross-section (e.g., from a pre-pressing diameter crimp of about 5.4 mm to about 5.0 mm at its widest cross-section dimension). For example, the crimping cross-section may result in compaction on both width and height of the cross-section.

Figure 32:
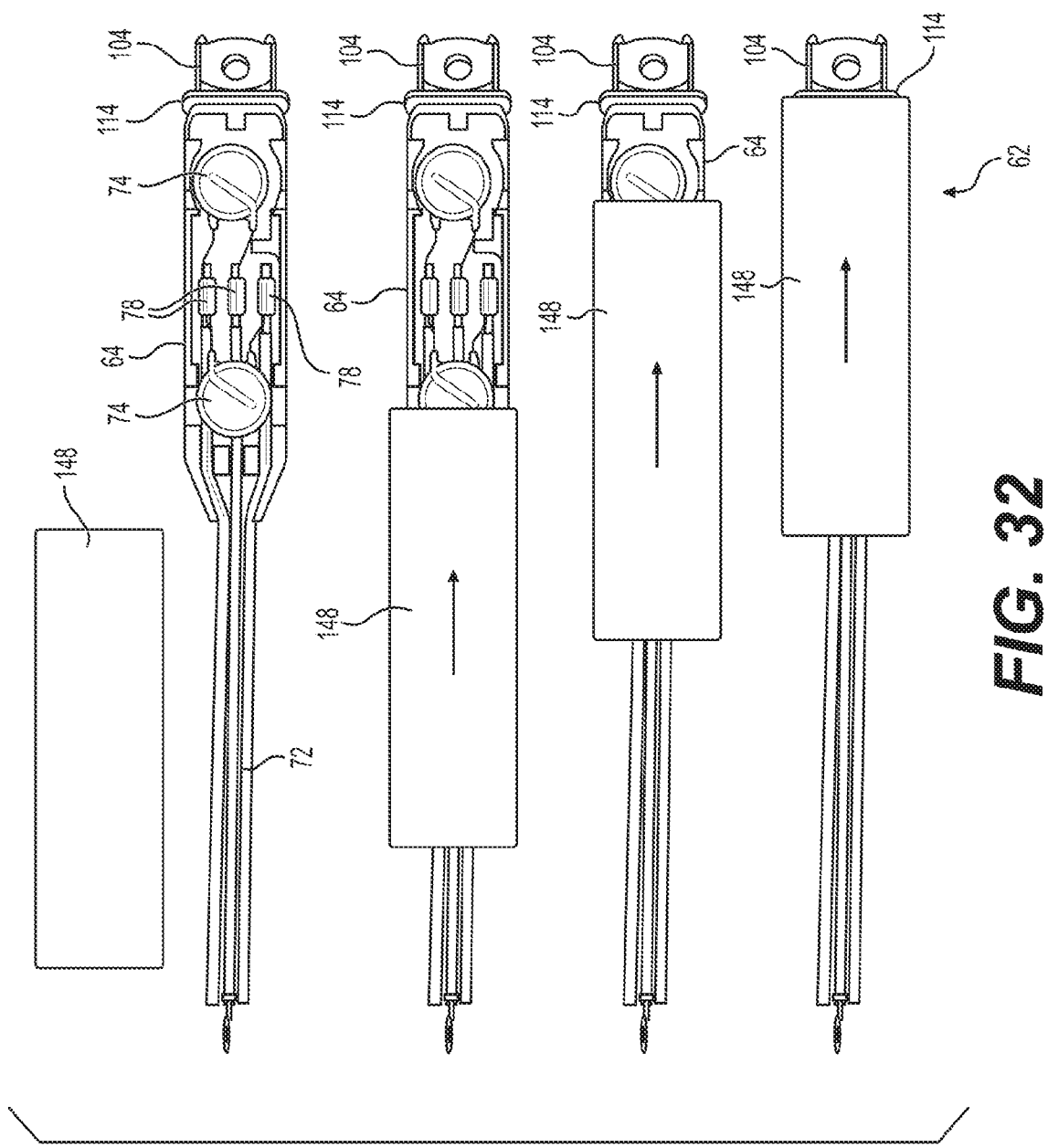
FIG. 32 is a sequence of views showing an example insulation sleeve being provide over an example carrier having crimped lugs, with one end of the example insulation sleeve abutting an example flange at an end of the carrier so the example mounting boss remains exposed, all prior to heating the example insulation sleeve to shrink the insulation sleeve, thereby securing it to the carrier and covering the surge protection components, the lugs, and ends of the electrical conductors received in the lugs.

FIG. 32 is a sequence of views showing an example insulation sleeve 148 being provided over an example carrier 64 having crimped lugs 78, with one end of the example insulation sleeve 148 abutting the example flange 114 at the second end 70 of the carrier 64, so the example mounting boss 104 remains exposed, all prior to heating the example insulation sleeve 148 to shrink the insulation sleeve 148, thereby securing it to the carrier 64 and covering the surge protection components 74, the lugs 78, and ends of the electrical conductors 72 received in the lugs 78. In some examples, the insulation sleeve 148 may be configured tighten around at least a portion of the carrier upon exposure to heat (e.g., it may be a heat-shrink sleeve). Other configurations of insulation are contemplated. For example, the insulation layer may include a conformal coating, or similar coating, covering at least a portion of the carrier to electrically insulate the electrical connection between the at least two electrical conductors and the surge protection component. For example, the conformal coating may be applied via one or more of brushing, spraying, dipping, or selective coating by machine, and may include conformal coating compositions, such as, for example, one or more of acrylic, epoxy, polyurethane, silicone, fluorinated or non-fluorinated polyparaxylylene (parylene), or amorphous fluoropolymer.

Figure 33:
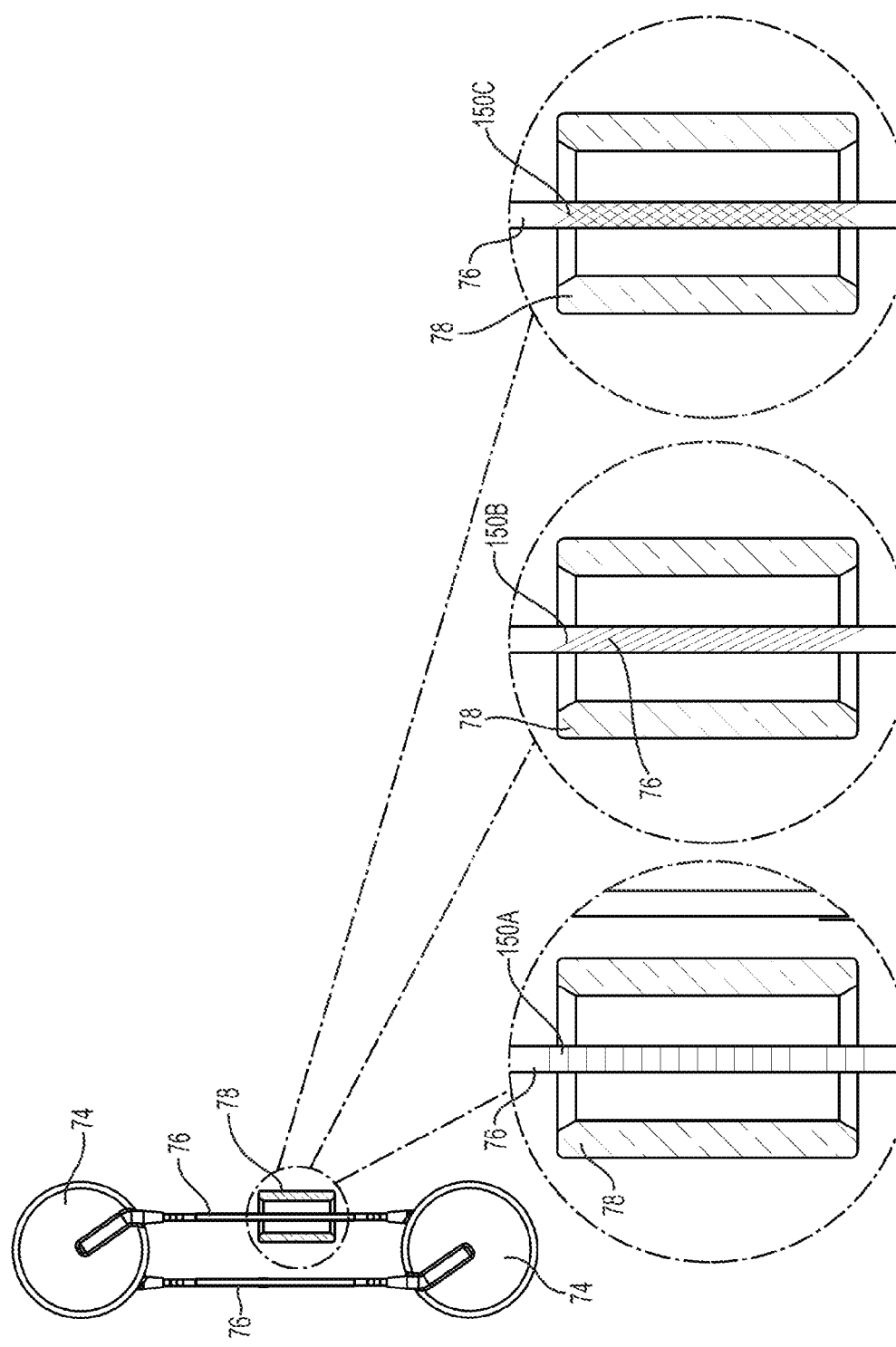
FIG. 33 is a schematic partial section view showing three example surface-scorings of example leads for example electrical components.

Some examples of the leads 76 of the surge protection components 74 (or other leads) may be scored (e.g., surface-scored), which may, in some examples, result in a more secure physical joining of the leads 76 to one another and/or in an improved electrical conductivity performance of the connection between the leads 76. FIG. 33 is a schematic partial section view showing three example surface scorings of example leads 76, for example, for surge protection components 74 coupled to one another via crimping an example lug 78 (shown un-crimped in FIG. 33). As shown, in a first example, the scoring 150A includes circumferential surface-scoring of the example lead 76. In a second example, the scoring 150B includes a helical surface-scoring about the example lead 76. In a third example, the scoring 150C includes a double-helical surface-scoring about the example lead 76, with helical surface-scoring in both directions about the lead 76. Other configurations of scoring are contemplated, for example, including any combination of the example scorings 150A, 150B, and/or 150C. In some examples, the scoring may be formed via one or more pressings, via one or more clampings, via grinding, via machine turning, and/or any other processes to form scoring on the leads 76.

A method for improving at least one of a physical connection or an electrical connection between two electrical leads 76 coupled to one another via crimping, in some examples, may include providing a first electrical lead 76 from a first electrical component, providing a second electrical lead 76 from a second electrical component, scoring at least one of the first electrical lead 76 or the second electrical lead 76 (e.g., both the first and second electrical leads 76). The method may also include providing a lug 78 around a portion of the first electrical lead 76 and around a portion of the second electrical lead 76, and pressing the lug 78, for example, as described herein, such that the lug 78, the first electrical lead 76, and the second electrical lead 76 are physically coupled to one another and electrically coupled to one another. In some example, scoring the at least one of the first electrical lead 76 or the second electrical lead 76 may include surface-scoring the at least one of the first electrical lead 76 or the second electrical lead 76, such that the scoring includes at least one of circumferential scoring, helical scoring, or double-helical scoring. In some examples, scoring the at least one of the first electrical lead 76 or the second electrical lead 76 may include at least one of pressing, clamping, grinding, machining, or machine-turning. This may result in at least partial formation of an electrical component, such as for example, one or more of the electrical components described herein, as well as others. For example, the electrical component may include a surge protection device, and/or a component including a surge protection device.

Although this subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
   providing a carrier configured to receive at least one electrical conductor and at least one surge protection component, the carrier defining a pocket;
   providing a lug in the pocket of the carrier, the lug defining a hollow space;
   providing an electrical lead of a surge protection component in the hollow space of the lug;
   providing an electrical conductor in the hollow space of the lug; and
   pressing the lug to crimp the lug onto the electrical lead of the surge protection component and the electrical conductor, such that the electrical lead and the electrical conductor are physically coupled to one another and electrically coupled to one another,
   wherein the carrier defines a first pocket and a second pocket, each of the first pocket and the second pocket configured for receiving a lug defining a hollow space, and wherein providing the lug in the pocket of the carrier comprises:
      providing a first lug in the first pocket, the first lug defining a first hollow space; and
      providing a second lug in the second pocket, the second lug defining a second hollow space; and
      providing the electrical lead of the surge protection component in the hollow space of the lug comprises:
         providing a first electrical lead of the surge protection component in the first hollow space of the first lug; and
         providing a second electrical lead of the surge protection component in the second hollow space of the second lug.

2. The method of claim 1, wherein providing an electrical conductor in the hollow space of the lug comprises:
   providing a first electrical conductor in the first hollow space of the first lug; and
   providing a second electrical conductor in the second hollow space of the second lug.

3. The method of claim 2, wherein pressing the lug to crimp the lug comprises:
   pressing the first lug to crimp the first lug onto the first electrical lead of the surge protection component and the first electrical conductor, such that the first electrical lead and the first electrical conductor are physically coupled to one another and electrically coupled to one another; and
   pressing the second lug to crimp the second lug onto the second electrical lead of the surge protection component and the second electrical conductor, such that the second electrical lead and the second electrical conductor are physically coupled to one another and electrically coupled to one another.

4. The method of claim 3, wherein pressing the first lug and pressing the second lug comprises pressing the first lug and the second lug substantially simultaneously.

5. The method of claim 1, wherein the carrier further defines a third pocket configured for receiving a lug defining a hollow space, and wherein:
providing the lug in the pocket of the carrier comprises providing a third lug in the third pocket, the third lug defining a third hollow space; and
providing an electrical conductor in the hollow space of the lug comprises providing a third electrical conductor in the third hollow space of the third lug.

6. The method of claim 5, wherein pressing the lug to crimp the lug comprises:
pressing the first lug to crimp the first lug onto the first electrical lead of the surge protection component and the first electrical conductor, such that the first electrical lead and the first electrical conductor are physically coupled to one another and electrically coupled to one another;
pressing the second lug to crimp the second lug onto the second electrical lead of the surge protection component and the second electrical conductor, such that the second electrical lead and the second electrical conductor are physically coupled to one another and electrically coupled to one another; and
pressing the third lug to crimp the third lug onto the third electrical conductor, such that the third lug and the third electrical conductor are physically coupled to one another and electrically coupled to one another.

7. The method of claim 5, wherein the surge protection component comprises a first surge protection component, and the method further comprises:
providing a first electrical lead of a second surge protection component in the first lug; and
providing a second electrical lead of the second surge protection component in one of the second hollow space of the second lug or the third hollow space of the third lug.

8. The method of claim 7, wherein pressing the lug to crimp the lug comprises:
pressing the first lug to crimp the first lug onto the first electrical lead of the first surge protection component, the first electrical lead of the second surge protection component, and the first electrical conductor, such that the first electrical lead of the first surge protection component, the first electrical lead of the second surge protection component, and the first electrical conductor are physically coupled to one another and electrically coupled to one another;
pressing the second lug to crimp the second lug onto the second electrical lead of the first surge protection component and the second electrical conductor, such that the second electrical lead and the second electrical conductor are physically coupled to one another and electrically coupled to one another; and
pressing the third lug to crimp the third lug onto the second electrical lead of the second surge protection component and the third electrical conductor, such that the second electrical lead of the second surge protection component and the third electrical conductor are physically coupled to one another and electrically coupled to one another.

9. The method of claim 7, further comprising:
providing a first electrical lead of a third surge protection component in the first lug; and
providing a second electrical lead of the third surge protection component in one of the second hollow space of the second lug or the third hollow space of the third lug.

10. The method of claim 9, wherein pressing the lug to crimp the lug comprises:
pressing the first lug to crimp the first lug onto the first electrical lead of the first surge protection component, the first electrical lead of the second surge protection component, the first electrical lead of the third surge protection component, and the first electrical conductor, such that the first electrical lead of the first surge protection component, the first electrical lead of the second surge protection component, the first electrical lead of the third surge protection component, and the first electrical conductor are physically coupled to one another and electrically coupled to one another;
pressing the second lug to crimp the second lug onto and the second electrical lead of the first surge protection component, the second electrical lead of the third surge protection component, and the second electrical conductor, such that the second electrical lead of the first surge protection component, the second electrical lead of the third surge protection component, and the second electrical conductor are physically coupled to one another and electrically coupled to one another; and
pressing the third lug to crimp the third lug onto the second electrical lead of the second surge protection component and the third electrical conductor, such that the second electrical lead of the second surge protection component and the third electrical conductor are physically coupled to one another and electrically coupled to one another.

11. The method of claim 9, further comprising:
providing a first electrical lead of a fourth surge protection component in the first lug; and
providing a second electrical lead of the fourth surge protection component in one of the second hollow space of the second lug or the third hollow space of the third lug.

12. The method of claim 11, wherein pressing the lug to crimp the lug comprises:
pressing the first lug to crimp the first lug onto the first electrical lead of the first surge protection component, the first electrical lead of the second surge protection component, the first electrical lead of the third surge protection component, the first electrical lead of the fourth surge protection component, and the first electrical conductor, such that the first electrical lead of the first surge protection component, the first electrical lead of the second surge protection component, the first electrical lead of the third surge protection component, the first electrical lead of the fourth surge protection component, and the first electrical conductor are physically coupled to one another and electrically coupled to one another;
pressing the second lug to crimp the second lug onto and the second electrical lead of the first surge protection component, the second electrical lead of the third surge protection component, and the second electrical conductor, such that the second electrical lead of the first surge protection component, the second electrical lead of the third surge protection component, and the second electrical conductor are physically coupled to one another and electrically coupled to one another; and
pressing the third lug to crimp the third lug onto the second electrical lead of the second surge protection component, the second electrical lead of the fourth surge protection component, and the third electrical conductor, such that the second electrical lead of the second surge protection component, the second electrical lead of the fourth surge protection component, and the third electrical conductor are physically coupled to one another and electrically coupled to one another.

13. A method comprising:

providing at least one electrical conductor in a first lug having a first hollow space;

providing at least one electrical conductor in a second lug having a second hollow space;

providing at least one electrical conductor in a third lug having a third hollow space; and pressing the first lug, the second lug, and the third lug to physically couple and electrically couple the first lug, the second lug, and the third lug to the respective electrical conductors, wherein the pressing comprises forming at least one of the first lug, the second lug, or the third lug such that the first lug, the second lug, or the third lug has a substantially rectangular cross-sectional shape.

14. The method of claim 13, wherein pressing the first lug, the second lug, and the third lug comprises pressing the first lug, the second lug, and the third lug substantially simultaneously.

15. The method of claim 13, wherein pressing the first lug, the second lug, and the third lug comprises pressing the first lug, the second lug, and the third lug at substantially equal force.

16. A method for improving at least one of a physical connection or an electrical connection between two electrical leads coupled to one another via crimping, the method comprising:

providing a first electrical lead from a first electrical component;

providing a second electrical lead from a second electrical component;

scoring at least one of the first electrical lead or the second electrical lead;

providing a lug around a portion of the first electrical lead and around a portion of the second electrical lead; and pressing the lug, such that the lug, the first electrical lead, and the second electrical lead are physically coupled to one another and electrically coupled to one another.

17. The method of claim 16, wherein scoring the at least one of the first electrical lead or the second electrical lead comprises surface-scoring the at least one of the first electrical lead or the second electrical lead, such that the scoring comprises at least one of circumferential scoring, helical scoring, or double-helical scoring.

18. The method of claim 16, wherein scoring the at least one of the first electrical lead or the second electrical lead comprises at least one of pressing, clamping, grinding, machining, or machine-turning.

* * * * *